United States Patent [19]
Phillips et al.

[11] Patent Number: 5,590,348
[45] Date of Patent: Dec. 31, 1996

[54] STATUS PREDICTOR FOR COMBINED SHIFTER-ROTATE/MERGE UNIT

[75] Inventors: James E. Phillips, Binghamton; Bartholomew Blaner, Newark Valley; Stamatis Vassiliadis, Vestal, all of N.Y.

[73] Assignee: International Business Machines Corporation, Armonk, N.Y.

[21] Appl. No.: 920,962

[22] Filed: Jul. 28, 1992

[51] Int. Cl.[6] ................................. G06F 9/00; G06F 5/00
[52] U.S. Cl. .................... 395/564; 395/800; 364/DIG. 2; 364/961.7
[58] Field of Search ..................................... 395/800, 375

[56] References Cited

U.S. PATENT DOCUMENTS

| | | | |
|---|---|---|---|
| 4,569,016 | 2/1986 | Hao et al. ................................. | 395/375 |
| 4,589,087 | 5/1986 | Auslander et al. ...................... | 364/468 |
| 4,766,566 | 8/1988 | Chuang .................................... | 395/800 |
| 5,051,940 | 9/1991 | Vassiliadis et al. ..................... | 364/736 |
| 5,197,135 | 3/1993 | Eickemeyer et al. ................... | 395/375 |
| 5,214,763 | 5/1993 | Blaner et al. ........................... | 395/375 |
| 5,295,249 | 5/1994 | Blaner et al. ........................... | 395/375 |
| 5,299,319 | 3/1994 | Vassiliadis et al. .................... | 395/375 |
| 5,301,341 | 4/1994 | Vassiliadis et al. .................... | 395/800 |
| 5,303,356 | 4/1994 | Vassiliadis et al. .................... | 395/375 |
| 5,355,460 | 10/1994 | Eickemeyer et al. ................... | 395/375 |

OTHER PUBLICATIONS

Taylor et al., "A 100 MHz floating Point Integer Processor"; IEEE; 1990.
IBM Technical Disclosure Bulletin, vol. 21, No. 1, Jun. 1978, Dixon et al., "Performing Arithmetic and Shifting Operations and Status Determination on Large Numbers in a Microprocessor," pp. 31–33.
IBM Technical Disclosure Bulletin, vol. 25, No. 1, Jun. 1982, Losq et al. "Zero Condition Code Detection for Early Resolution of BCS and BCRS," pp. 130–133.
IBM Technical Disclosure Bulletin, vol. 27, No. 1B, Jun. 1984, Cannon et al., "ALU Merge Operation," pp. 747–750.
IBM Technical Disclosure Bulletin, vol. 32, No. 2, Jul. 1989, Huffman et al., "Prediction of Shift Left Single and Shift Left Double Overflow Condition," pp. 454–458.
IBM Technical Disclosure Bulletin, vol. 32, No. 5B, Oct. 1989 Huffman, "RMU Mask Generation from Shift Amount or Pad/Start/End Specifications," pp. 197–204.

*Primary Examiner*—Alyssa H. Bowler
*Assistant Examiner*—L. Donaghue
*Attorney, Agent, or Firm*—Lynn L. Augspurger; Richard L. Aitken

[57] ABSTRACT

Generation of functional status followed by the use of the status to control the sequencing of microinstructions is a well known critical path in processor designs. The delay associated with the path is exacerbated in superscalar machines by the additional statuses that are produced by multiple functional units from which the appropriate status must be selected for controlling the sequencing of microinstructions. This is especially true in horizontally microcoded machines. The adverse affects on the delay can be reduced by using a staged multiplexor design. For the staged multiplexor to be useful, all functional unit status should be produced as early as possible. In this invention, a status predictor is described that allows the status associated with the shifter to be generated directly from the inputs to the shifter. As a result, the status is available early in the pipeline cycle in which the shift is actually performed and made available to the multiplexor producing the controls for microinstruction sequencing. In addition, the invention allows the early generation of all shifter status used to set condition codes. The predictor has been implemented in an ESA/390 processor implementation where it was instrumental in achieving the desired cycle time.

25 Claims, 16 Drawing Sheets

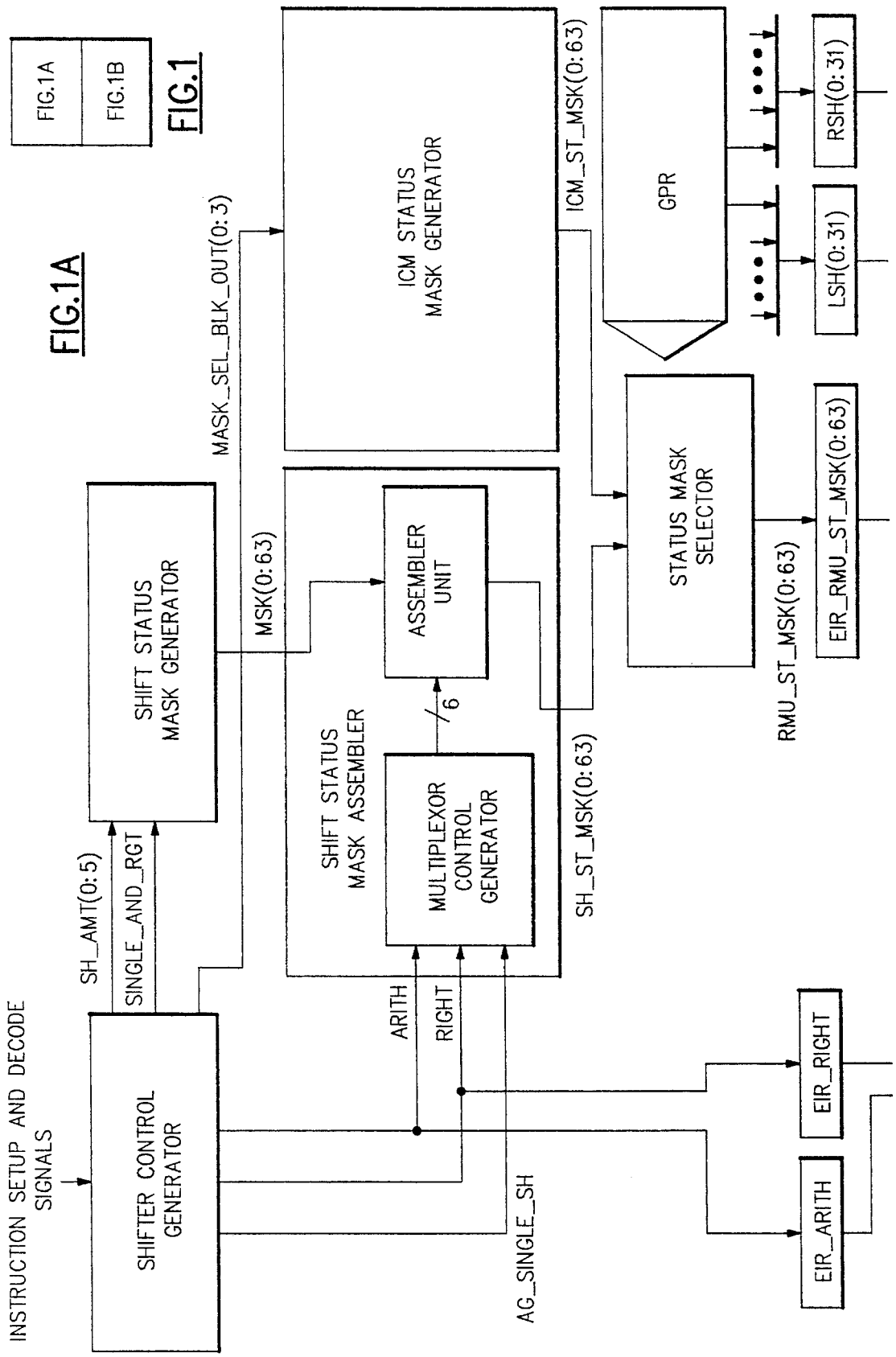

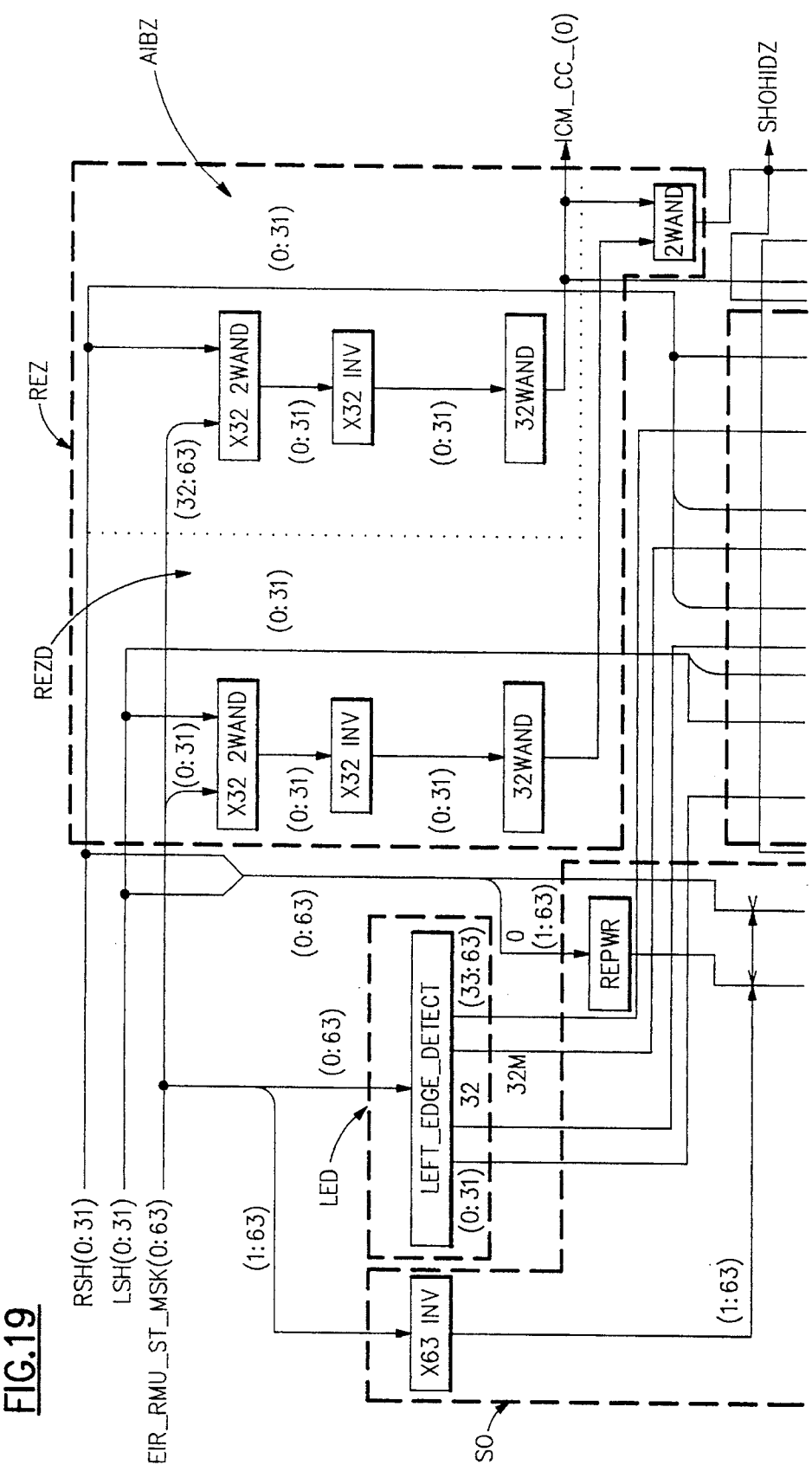

STATUS PREDICTOR FOR COMBINED SHIFTER-ROTATE/MERGE UNIT

CROSS REFERENCE TO RELATED APPLICATIONS

The present application is related to the following patent applications:

(1) Application Ser. No.: 08/186,221, filed Jan. 25, 1994, which is a continuation of application Ser. No. 08/013,982, filed Feb. 5, 1993, now abandoned, which is a continuation of application Ser. No. 07/519,384 (IBM Docket EN9-90-020), filed May 4, 1990, now abandoned, entitled "Scalable Compound Instruction Set Machine Architecture", the inventors being Stamatis Vassiliadis et al, now abandoned;

(2) Application Ser. No.: 08/184,891, filed Jan. 21, 1994, which is a continuation of application Ser. No. 08/015,272, filed Feb. 5, 1993, now abandoned, which is a continuation of application Ser. No. 07/519,382 (IBM Docket EN9-90-019), filed May 4, 1990, now abandoned, entitled "General Purpose Compound Apparatus For Instruction-Level Parallel Processors", the inventors being Richard J. Eickemeyer et al, now abandoned;

(3) Application Ser. No.: 07/504,910 (IBM Docket EN9-90-014), filed Apr. 4, 1990, now U.S. Pat. No. 5,051,940 entitled "Data Dependency Collapsing Hardware Apparatus", the inventors being Stamatis Vassiliadis et al, now U.S. Pat. No. 5,051,940, issued Sep. 24, 1991, for which reissue application 931,624 was filed on Aug. 18, 1992;

(4) Application Ser. No.: 07/522,291 (IBM Docket EN9-90-012), filed May 10, 1990,; now U.S. Pat. No. 5,035,378 entitled "Compounding Preprocessor For Cache", the inventors being Bartholomew Blaner et al now U.S. Pat. No. 5,214,763, issued May 25, 1993, and application Ser. No. 08/186,225, filed Jan. 24, 1994, which is a continuation of application Ser. No. 08/001,479, filed Jan. 7, 1993, now abandoned, which is a continuation of application Ser. No. 07/522,291, filed May 10, 1990, entitled "Compounding Preprocessor For Cache", the inventors being Bartholomew Blaner et al, now U.S. Pat. No. 5,214,763, issued May 25, 1993;

(5) Application Ser. No.: 08/098,240, filed Jan. 29, 1993, now U.S. Pat. No. 5,355,460 issued Oct. 11, 1994, which is a continuation of application Ser. No. 07/543,464 (IBM Docket EN9-90-018, filed Jun. 26, 1990, now abandoned, entitled "An In-Memory Preprocessor for a Scalable Compound Instruction Set Machine Processor", the inventors being Richard Eickemeyer et al, now abandoned;

(6) Application Ser. No. 07/543,458, (IBM Docket EN9-90-042) filed Jun. 26, 1990, now U.S. Pat. No. 5,194,135, entitled "Memory Management for Scalable Compound Instruction Set Machines with in Memory Compounding", the inventors being Richard Eickemeyer et al now U.S. Pat. No. 5,197,135, issued Mar. 23, 1993;

(7) Application Ser. No. 07/619,868 (IBM Docket EN9-90-033) filed Nov. 28, 1990 now U.S. Pat. No. 5,301,341, entitled "Overflow Determination for Three-Operand ALUS in a Scalable Compound Instruction Set Machine", the inventors being Stamatis Vassiliadis et al now U.S. Pat. No. 5,301,341, issued Apr. 5, 1994

(8) Application Ser. No. 07/642,011 (IBM Docket EN9-90-049) filed Jan. 15, 1991; now U.S. Pat. No. 5,295,249, entitled "Compounding Preprocessor for Cache", the inventors being Bartholomew Blaner et al now U.S. Pat. No. 5,295,249, issued Mar. 15, 1994;

(9) Application Ser. No. 677,066, (IBM Docket EN9-90-039, filed Mar. 29, 1991, entitled ""System for Compounding Instructions for an Instruction Processor with Different Attributes with Apparatus for Handling Test and Data with Differing Reference Point Information and Backward Compounding Apparatus for Compound Instructions", the inventors being Eickemeyer et al;

(10) Application Ser. No. 677,685, (IBM Docket EN9-90-040, filed Mar. 29, 1991, now U.S. Pat. No. 5,363,356, entitled "System for Preparing Instructions for Instruction Processor and System with Mechanism for Branching in the Middle of a Compound Instruction", the inventors being S. Vassiliadis et al now U.S. Pat. No. 5,303,356 issued Apr. 12, 1994; and

(11) Application Ser. No. 07/677,079 filed Mar. 29, 1991, now U.S. Pat. No. 5,299,319, entitled "Hign Performance Interlock Collapsing SCISM ALU Apparatus", the inventors being S. Vassiliadis et al now U.S. Pat. No. 5,299,319 issued Mar. 29, 1994;

(12) Application Ser. No. 07/906,729 filed Jun. 30, 1992, entitled "Multi-function Permutation Switch for Store Alignment, Byte Merging by Gathering/Spreading Operations, Shifting or Rotating", the Inventors being J. Phillips et al;

FIELD OF THE INVENTION

These inventions relate to digital computer systems and particularly to an improvement in the generation of status for a combined shifter-rotate/merge functional unit wherein all status from the unit is predicted thereby allowing the early generation of the status in order to avoid the generation and reporting of the status for controlling the sequence of microinstructions or machine instructions from becoming a critical path in the system.

These other co-pending applications are not specific to the present invention.

These co-pending applications and the present application are owned by one and the same assignee, International Business Machines Corporation of Armonk, N.Y.

The descriptions set forth in these co-pending applications are hereby incorporated into the present application by this reference.

GLOSSARY OF TERMS

While dictionary meanings are also implied by certain terms used here, the following glossary of some terms may be useful.

ESA/390 refers to and is a mark for the International Business Machines Corporation mainframe system architecture used in the Enterprise Systems Architecture machines in use today. This architecture is the standard for mainframe architecture throughout the world, and using the existing instructions is important to enable use of the existing architecture.

ICM is short for INSERT CHARACTER UNDER MASK, an existing ESA/390 instruction.

CLM is shod for COMPARE LOGICAL UNDER MASK, an existing ESA/390 instruction.

STCM is shod for STORE CHARACTER UNDER MASK, an existing ESA/390 instruction.

CISC means a complex instruction set computer common to the ESA/390 and superscalar machines.

RMU is shod for Rotation Merge Unit(s).

GPR is shod for general purpose register(s) used in an array in many machines.

BRANCH-LO means status conditions from functional units used for controlling the sequencing of microinstructions in a CISC processor.

BACKGROUND OF THE INVENTION

As background for our invention, we will review some IBM Technical Disclosure Bulletins, so that the reader can more quickly follow our discussion and understand how our invention differs. Initially, it will be understood that our invention provides a status predictor for a combined shift-rotate/merge unit, utilizes an existing ESA/390 CISC processor with a known predefined instruction set and as such is applicable to the Systems 370–390 in widespread use today by customers of International Business Machines Corporation. Other manufacturer's mainframes also use the IBM known predefined instruction set. Our invention allows the prediction of all shifter status thereby allowing such status to be produced early in the execution of the shift-rotate/merge unit and in parallel with its execution. This early generation of status allows the results of a shift-rotate/merge operation to determine the next microword being fetched during the same cycle that the shift is being executed and the condition code to be set at the end of the shift-rotate/merge unit execution and made available to the branch unit on the subsequent cycle for resolving conditional branches without impacting the machine cycle time of a high performance computer. The status includes that for setting condition codes for all arithmetic and logical shifts, insert character under mask (ICM), and BRANCH-LO conditions of shifter negative and shifter result equal-zero.

International Business Machines Corporation purblishes a Technical Disclosure Bulletin, known as the TDB, to document for the public's information inventions that have been made within the corporation. Turning now to the TDBs in this art, we note that Huffman in TDB 10-89 published a mechanism to produce a mask from a shift amount, or from a pad bit, start bit position and end bit position for controlling the merging of data from a rotator or from an alternative field. The mechanism, however, is not used to derive status, let alone predict status from the inputs, as our invention. The mechanism is only used to control whether bits from the rotator or from the alternative field are to be used as the output from the functional unit.

Losq et al in TDB 06-82 recognize the importance in pipelined processors for resolving condition codes early for branch resolution. They report that CC testing by Branch on Condition (BCs) and Branch on Condition Register (BCRs) test for condition code zero most frequently. Condition code of zero for compares and subtracts indicate that the result is zero. They publish a mechanism for predicting that the outcome will be zero by adding a bitwise compare of the operands for making this determination. They, however, do not consider prediction of shifter-rotate/merge operations.

Huffman et al in TDB 07-89 publish a mechanism for predicting overflow in a shifter. The mechanism, however, does not provide for predicting all shift-rotate/merge unit status such as result equal zero, result less than zero, result greater than zero, left most inserted bit a one, left most inserted bit a zero and not all inserted bits zero, all inserted bits zero as we do.

Dixon et al in TDB 06-78 provide for determining status for operands that are larger than the operands handled by a single functional unit in the data path of a processor by publishing special, duplicate instructions, providing cumulative zero and a non-zero status indicators, and providing latched carry status indicators to remember carries, borrows, or bits shifted from a unit, and a holdover latch to provide inter-instruction status for accumulating status across more than one instruction execution. They, however, to not consider predicting the status in a shifter-rotate/merge unit.

Cannon et al in TDB 06-84 publish a combined ALU/merge unit in which the carry generator is modified such that its output is controlled by a corresponding bit in a mask specifying the merge operation during a merge operation. The sum generator is modified such that its output when in merge mode reflects the status of the corresponding bit in either the A register input to the ALU or the B register input to the ALU, depending on the output from the carry generator. The merged unit allows merging in the ALU without increasing the number of logic stages for a given bookset. Rotation of operands, however, must be done prior to loading in the A or B register inputs to the ALU. Prediction of status for a unit in which shifts as well as rotate/merge operations are supported is therefore not considered.

SUMMARY OF THE INVENTION

Our invention deals with the generation of status for a combined shift-rotate/merge unit. Generation of functional status followed by the use of the status to control the sequencing of microinstructions is a well known critical path in processor designs. The delay associated with the path is exacerbated in superscalar machines by the additional statuses that are produced by multiple functional units from which the appropriate status must be selected for controlling the sequencing of microinstructions. This is especially true in horizontally microcoded machines. The adverse affects on the delay can be reduced by using a staged multiplexor design. For the staged multiplexor to be useful, all functional unit status should be produced as early as possible. This invention covers a status predictor for a combination shift-rotate/merge unit, like that contained in co-pending

(12) Application Ser. No. 07/906,729 filed Jun. 30, 1992, entitled "Multifunction Permutation Switch for Store Alignment, Byte Merging by Gathering/Spreading Operations, Shifting or Rotating", the Inventors being J. Phillips et al; wherein all status for controlling the sequencing of microinstructions as well as for setting condition codes is produced directly off the inputs to the unit. As a result, the status is available early in the pipeline cycle in which the operation to be performed .by the unit is actually executed and is made available to the multiplexor producing the controls for microinstruction sequencing. In addition, the mechanism allows the early generation of all of the units status that is used to set condition codes. The predictor has been implemented in an ESA/390 processor implementation where it was instrumental in achieving the desired cycle time.

These and other improvements are set forth in the following detailed description. For a better understanding of the invention with advantages and features, refer to the description and to the drawings.

Figure 1B:
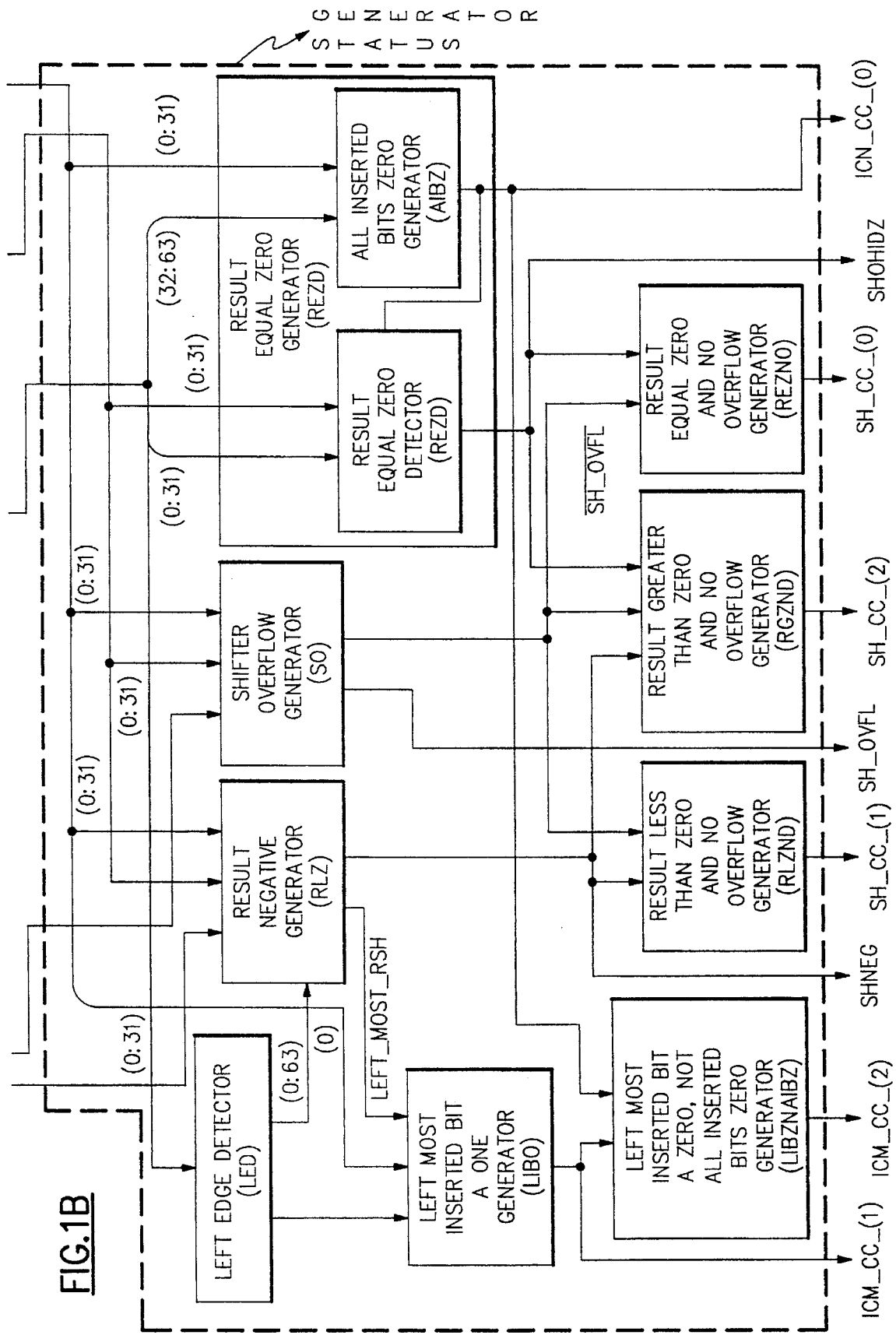
In FIG. 1 is shown an overview our invention for predicting the status from a combined shift-merge/rotate unit.
Figure 2:
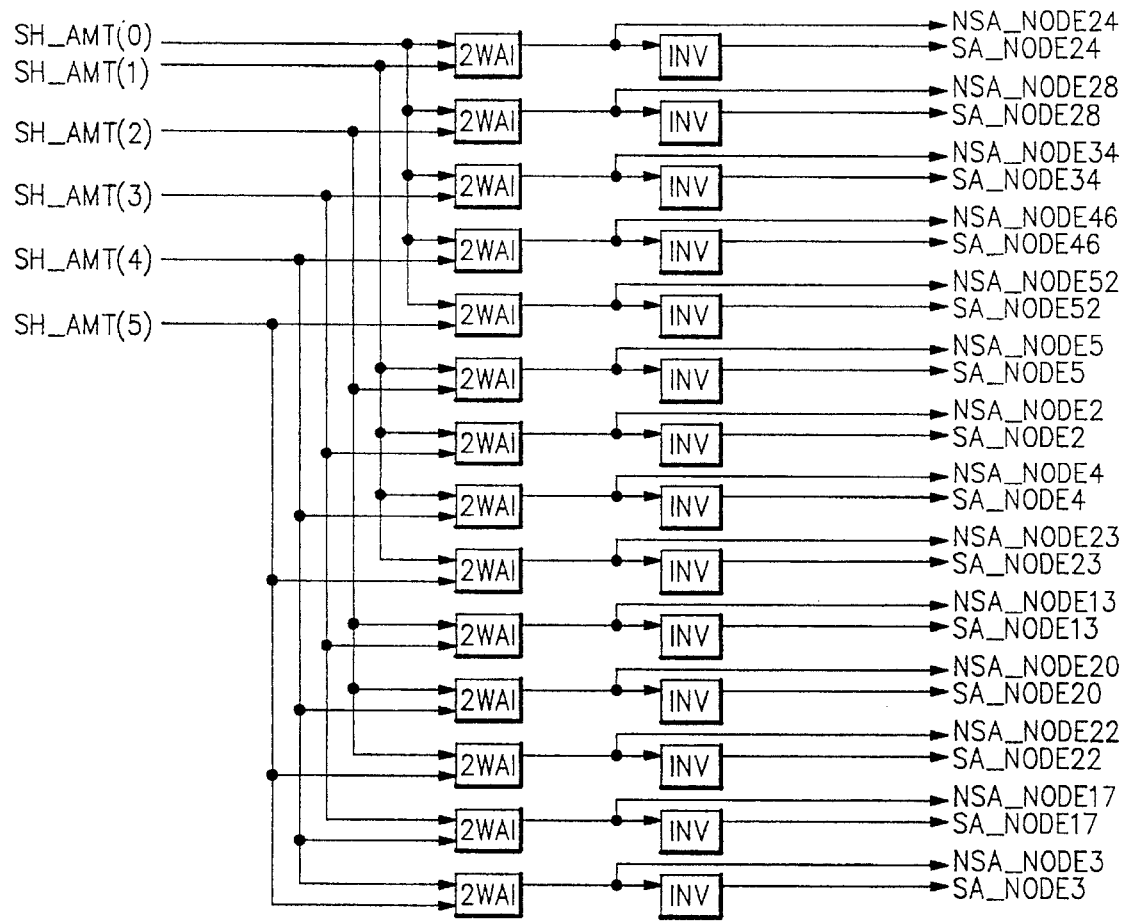
In FIGS. 2, 3, 4, 5, 6, 7, 8, 9, 10, 11, 12, 13, 14, 15 and 16 is shown logic that is used to generate individual mask bits that when applied to the input operands to the combined shift and rotate/merge unit can be used to determine that the result of a shift operation is zero.
Figure 6:
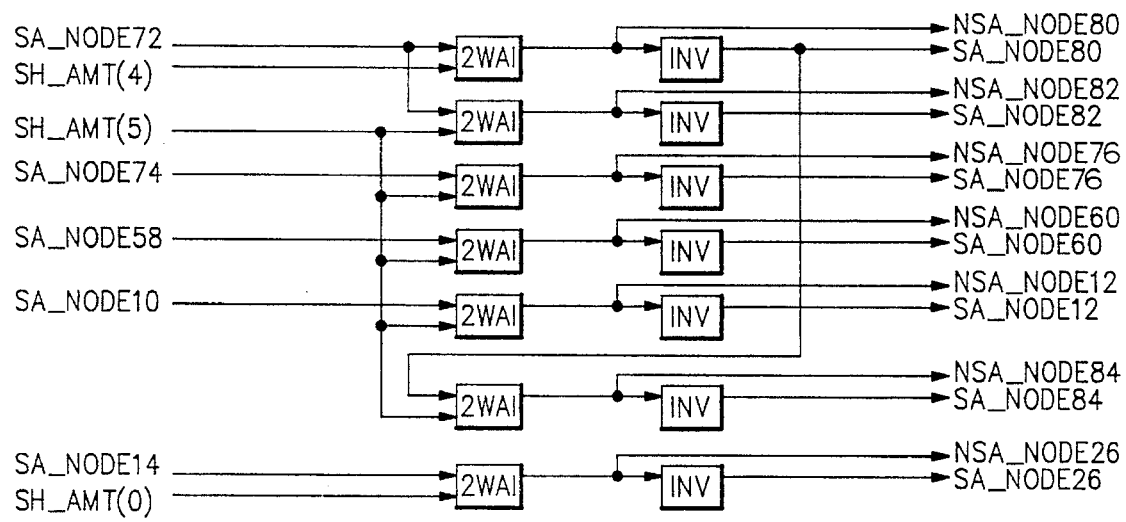
Figure 3:
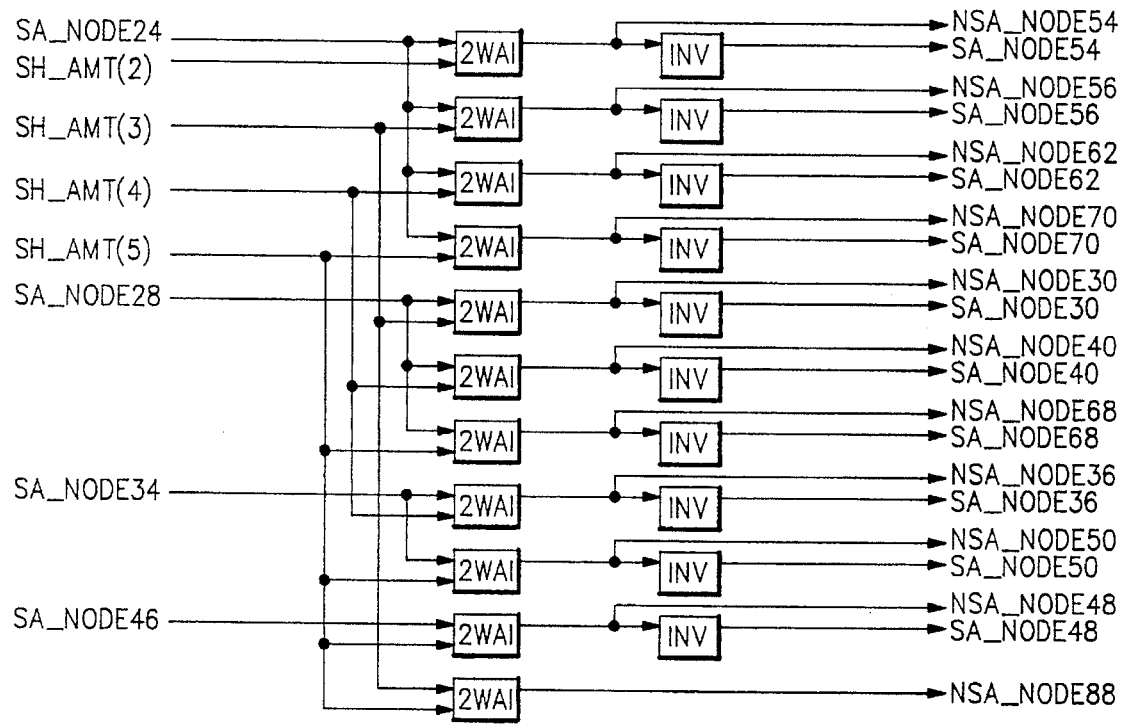
Figure 4:
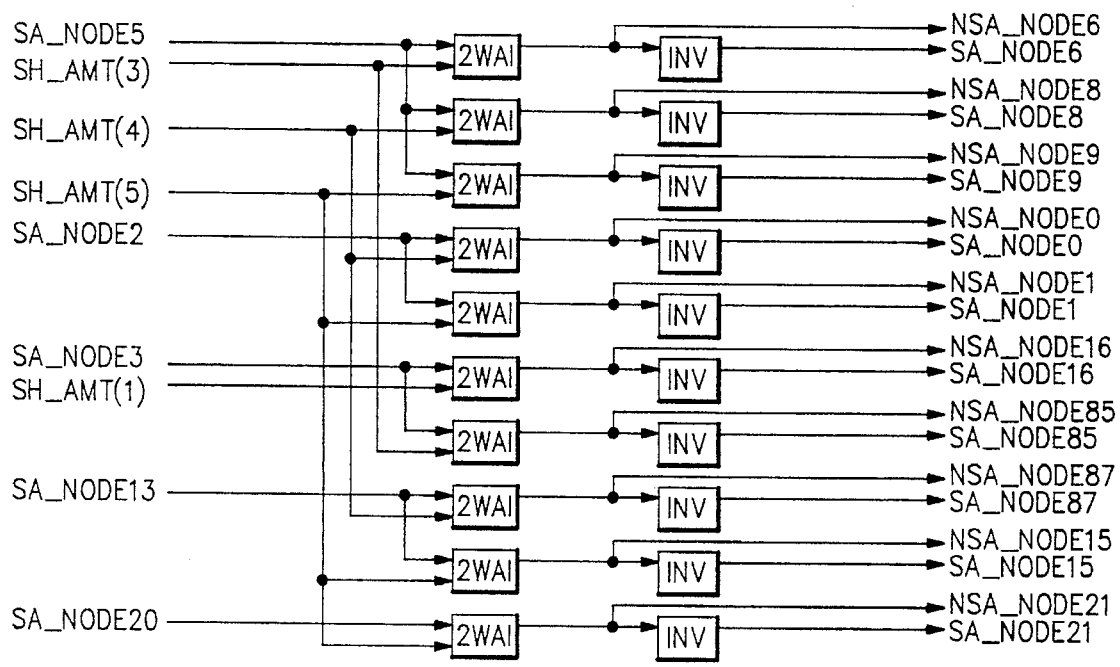
Figure 5:
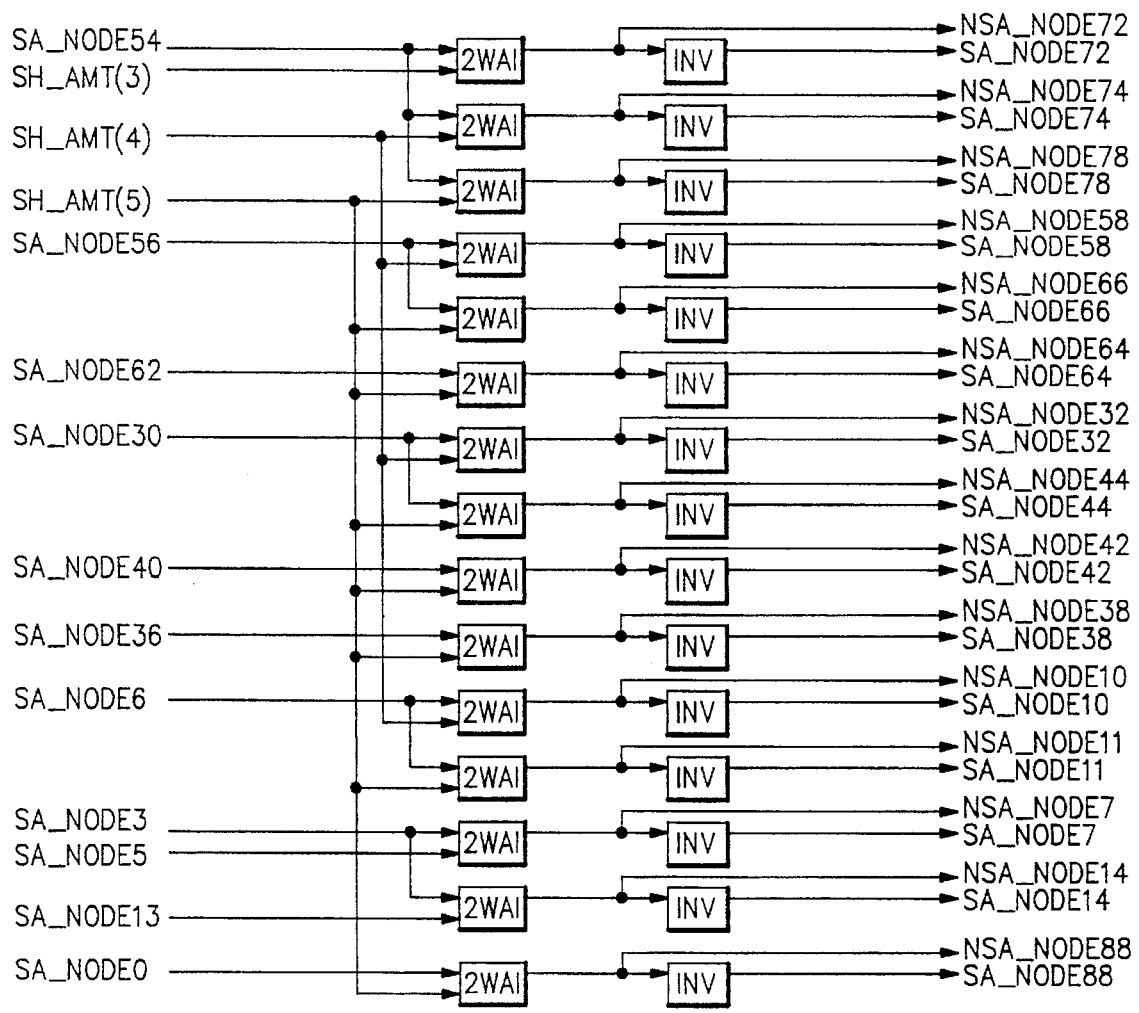
Figure 7:
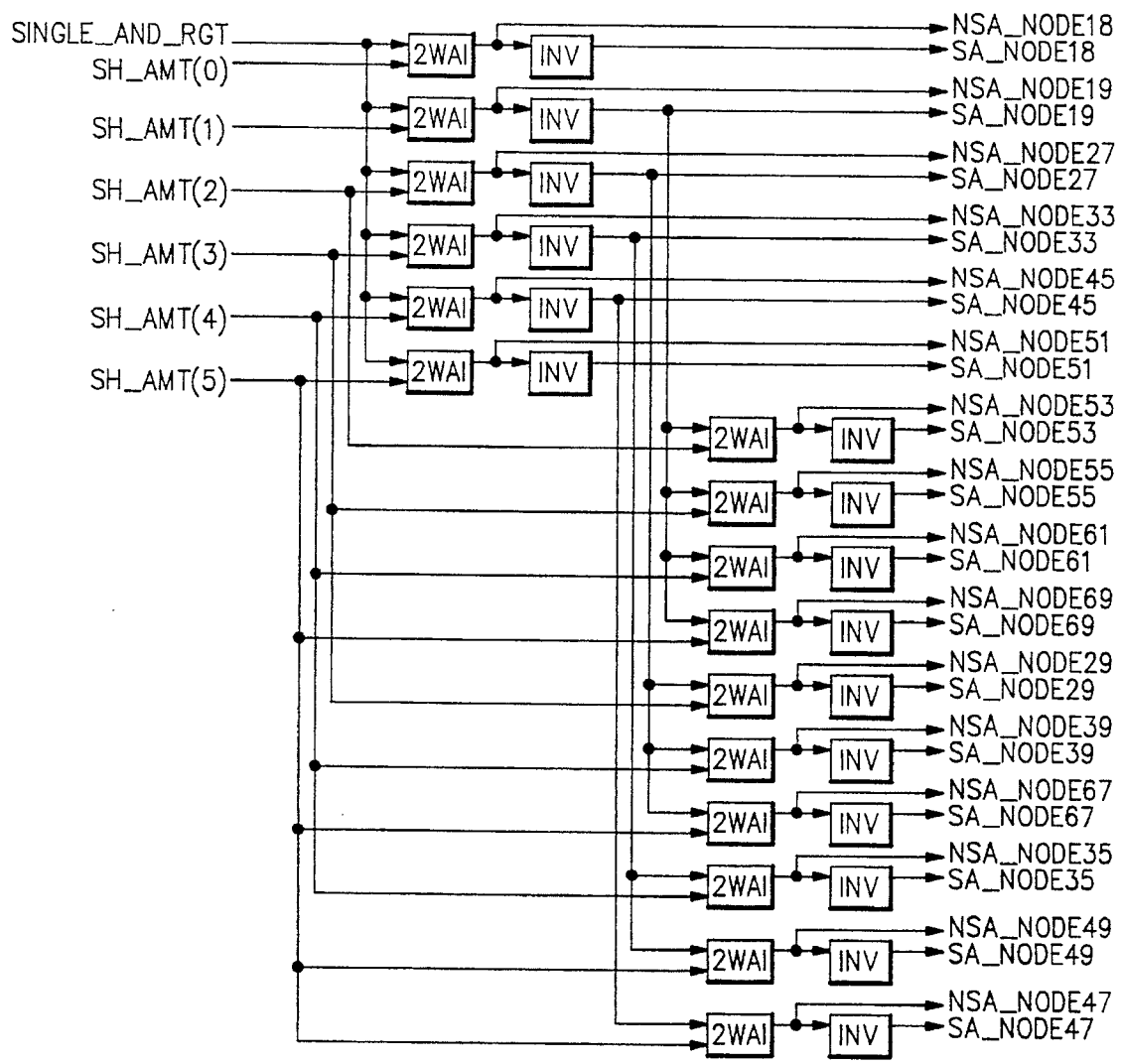
Figure 8:
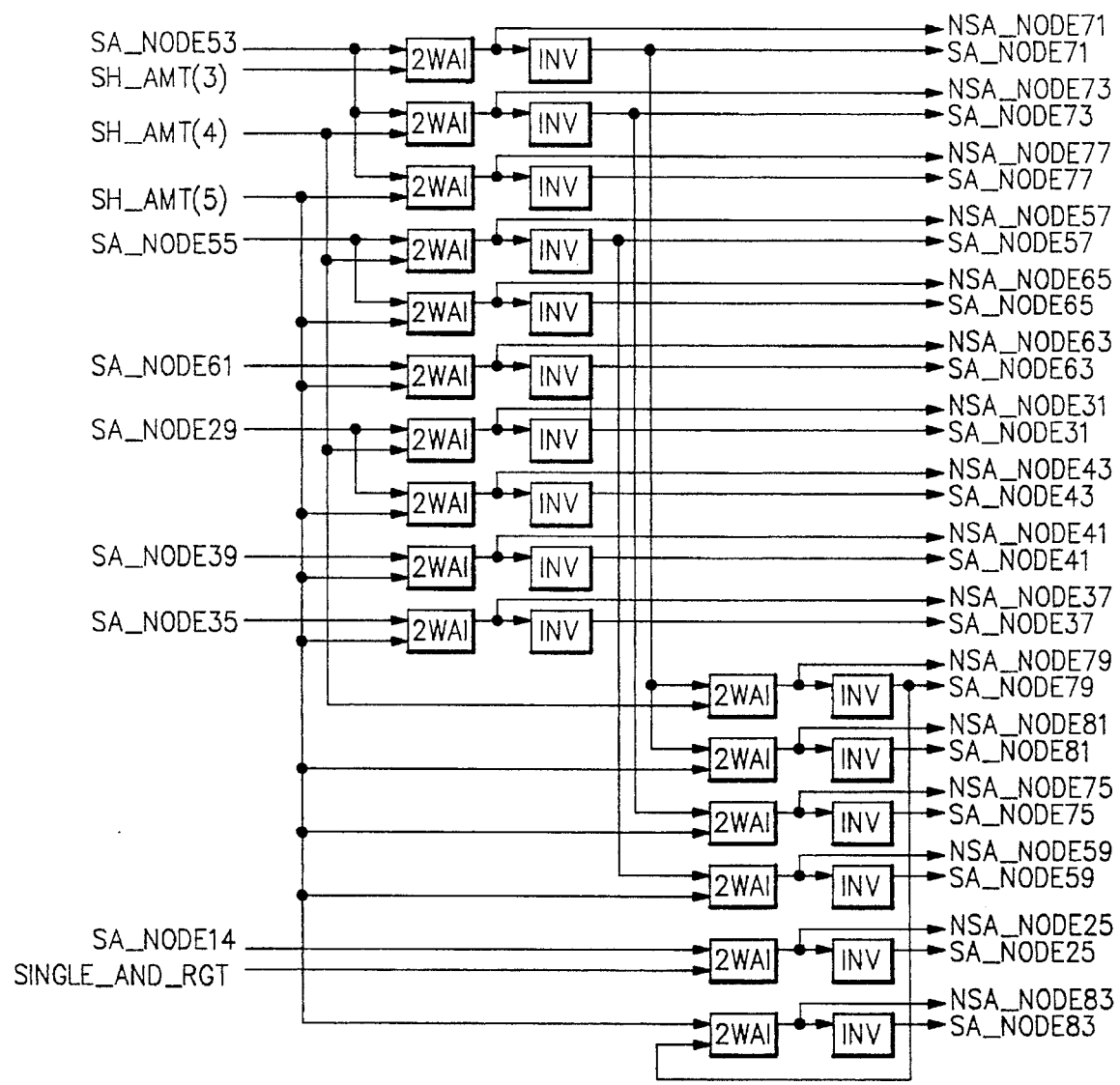
Figure 9:
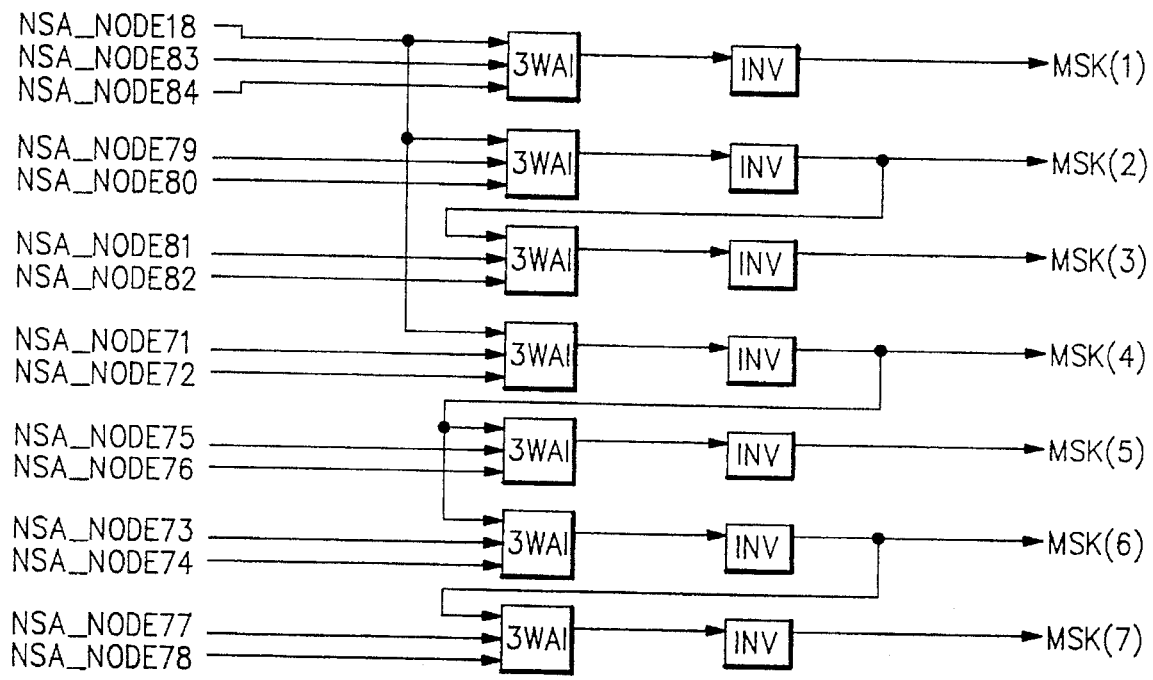
Figure 10:
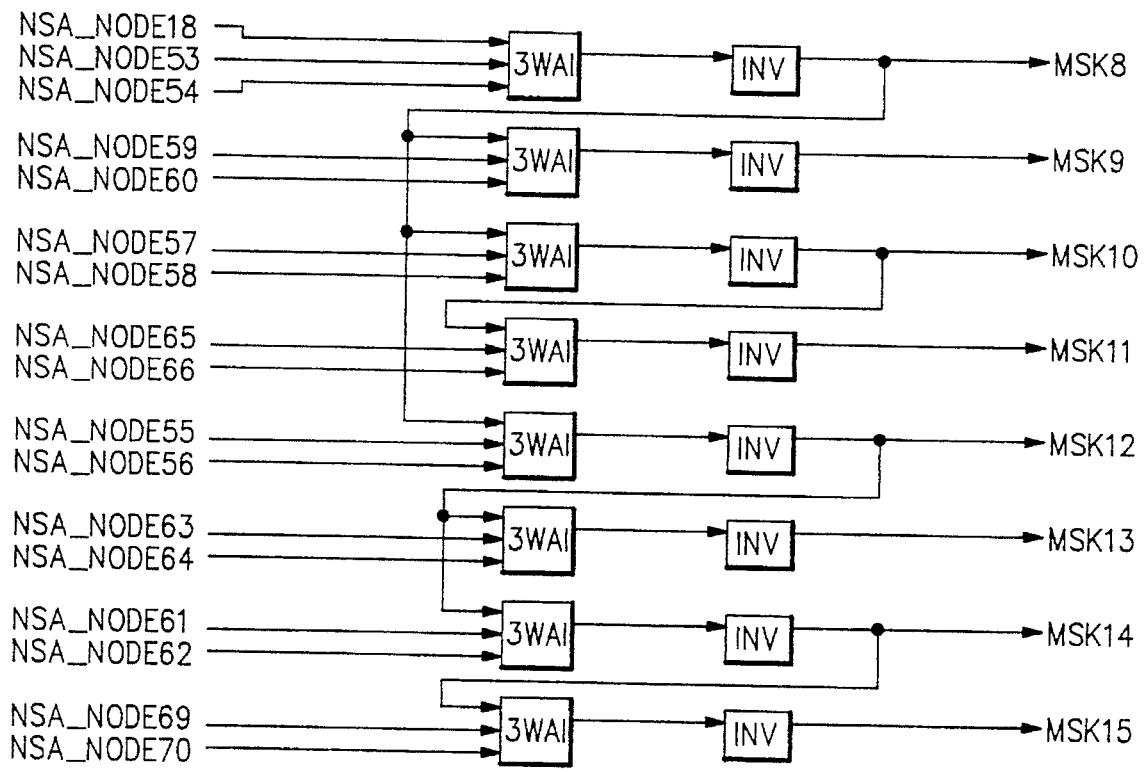
Figure 11:
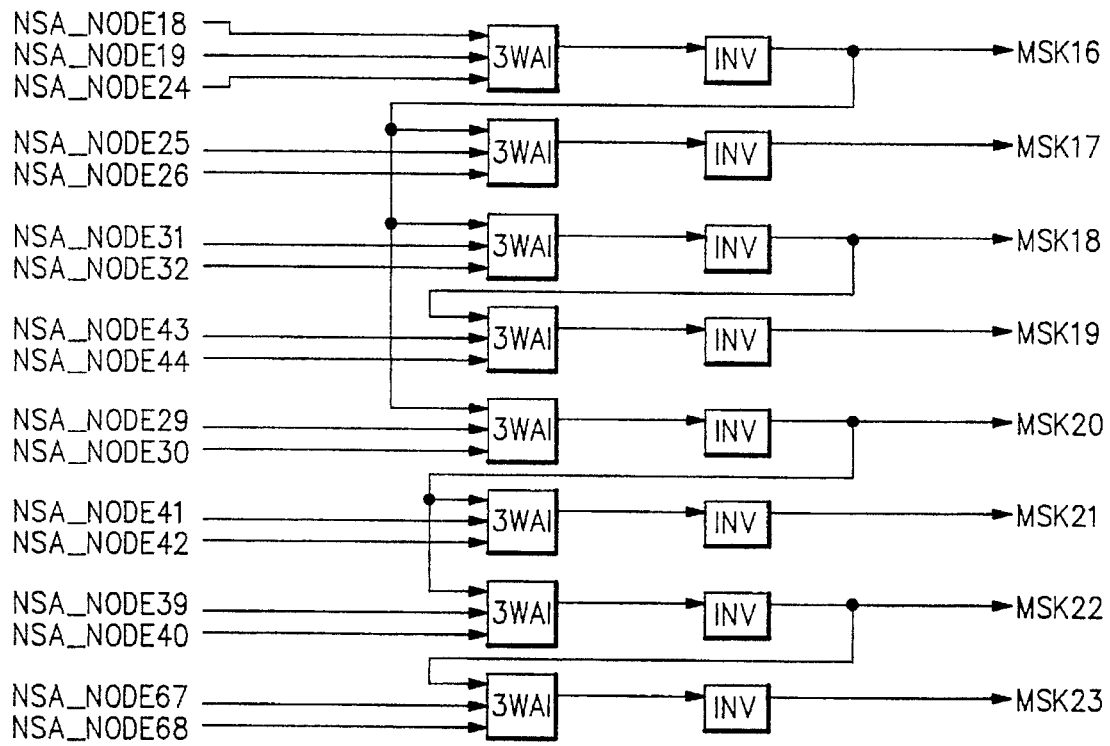
Figure 12:
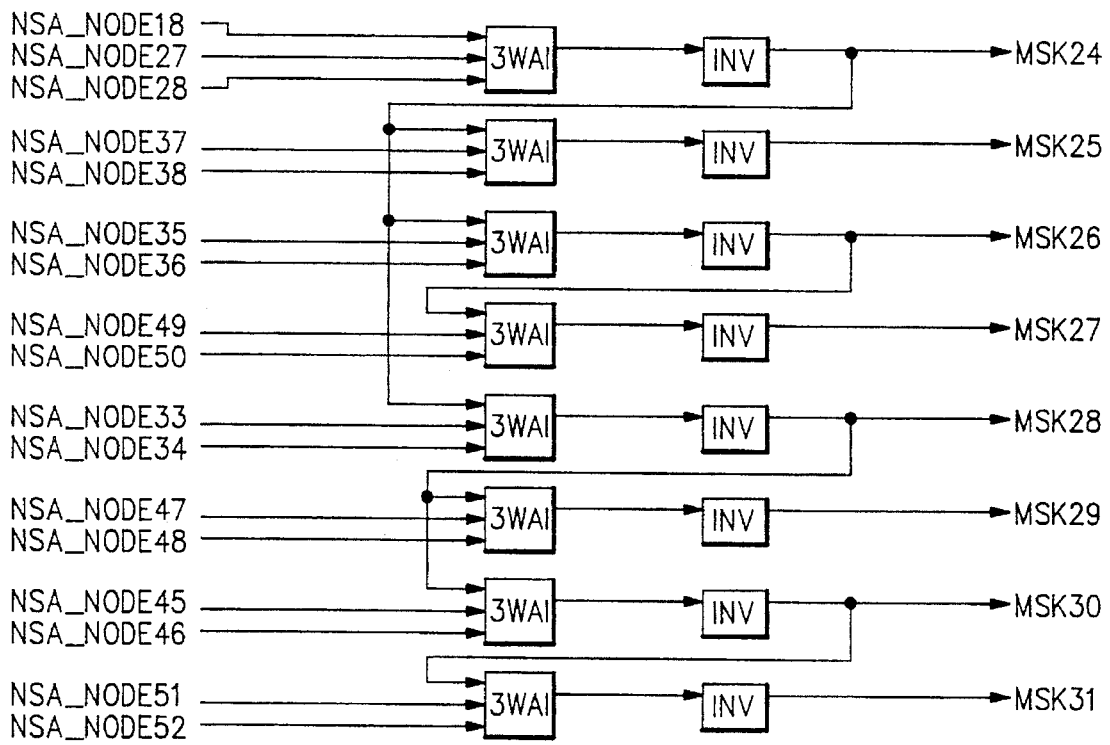
Figure 13:
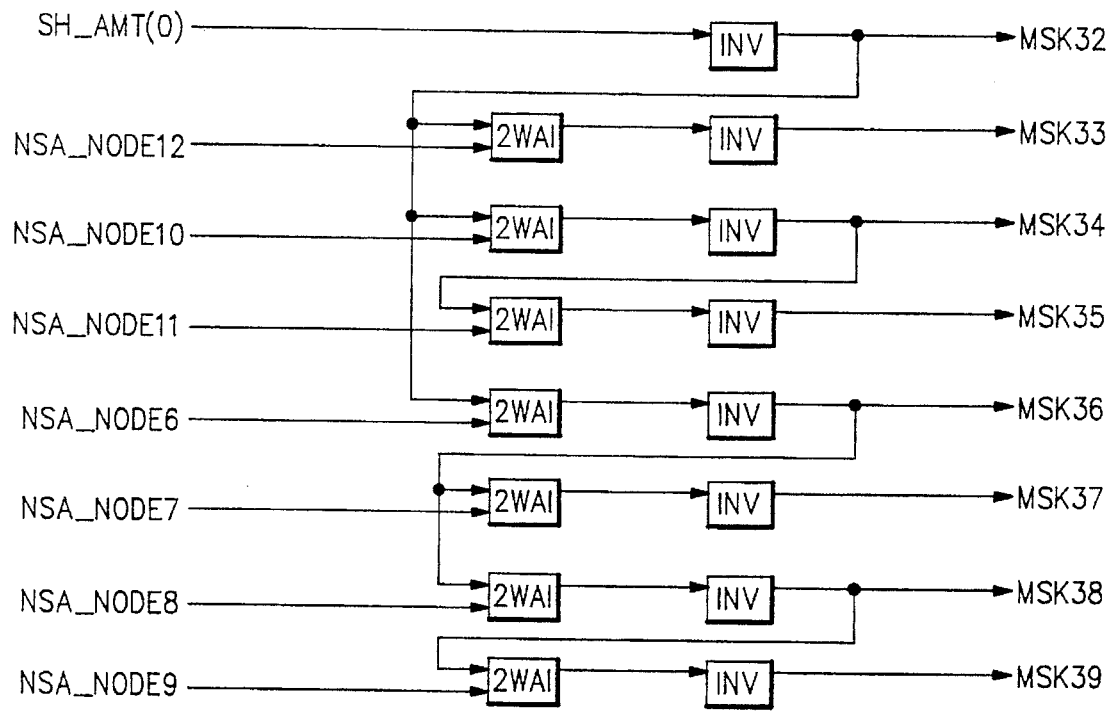
Figure 14:
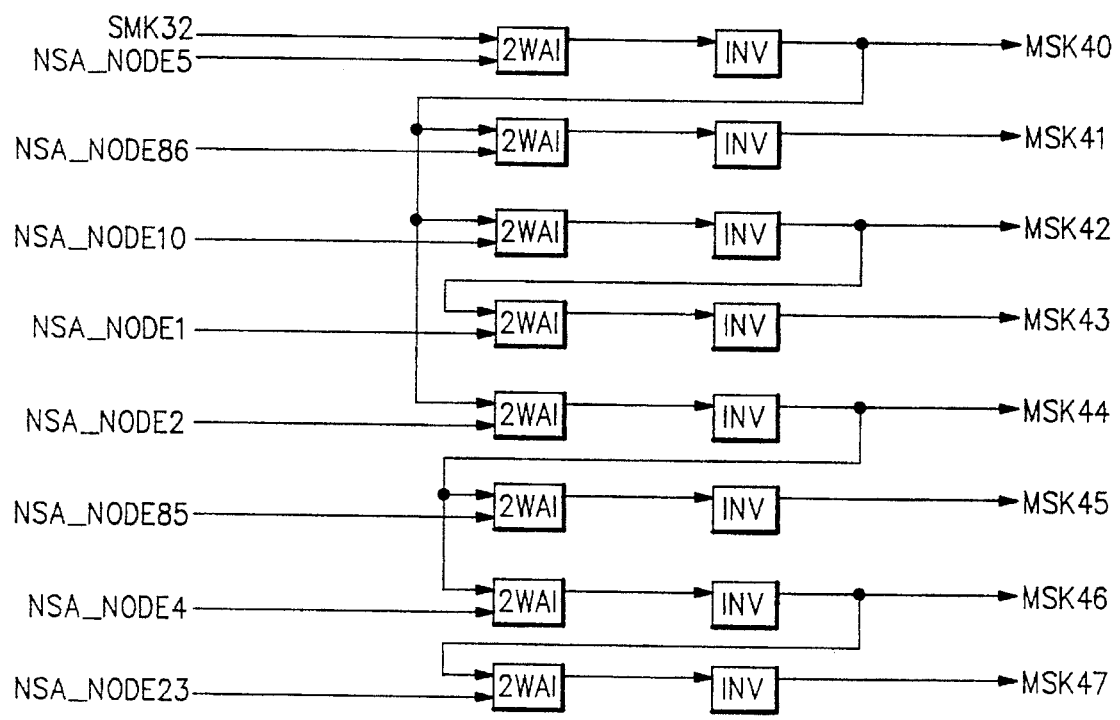
Figure 15:
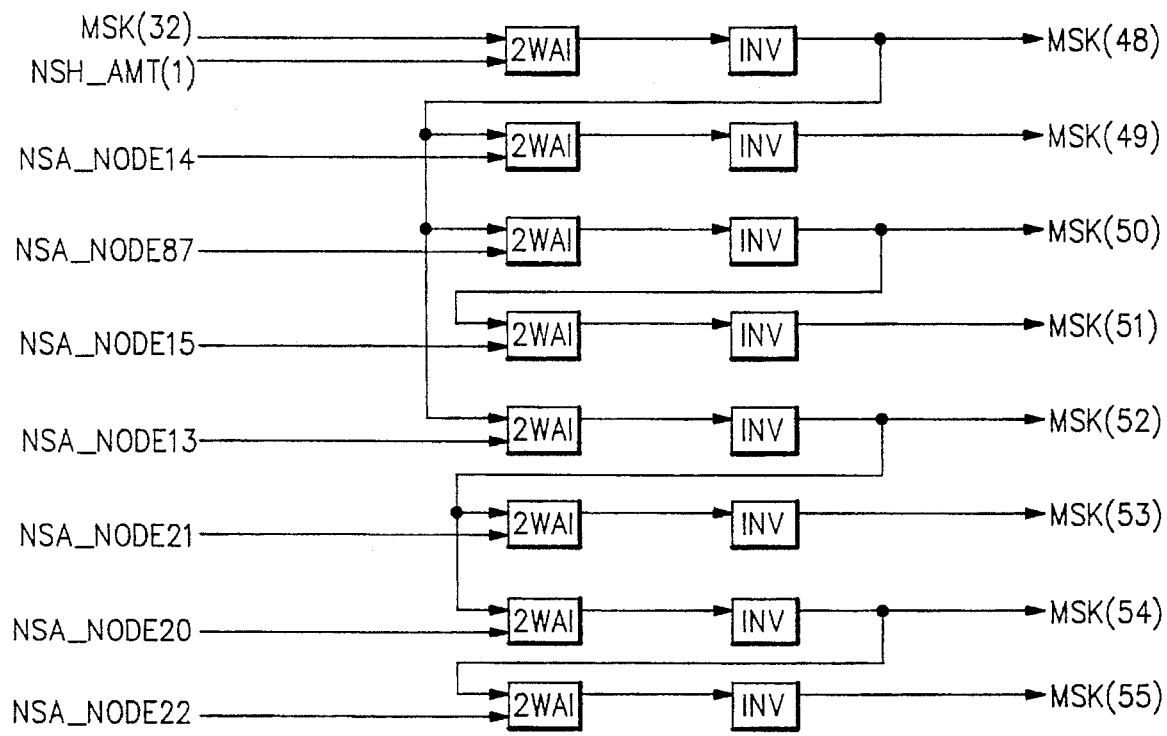
Figure 16:
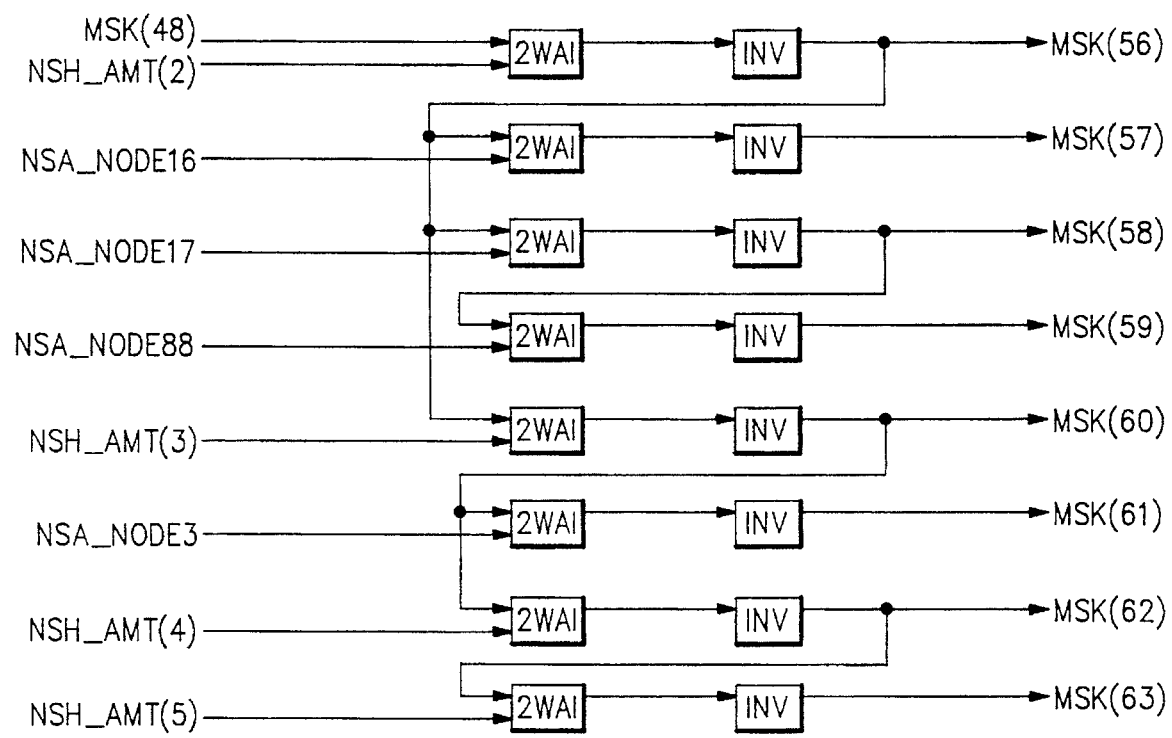
Figure 17:
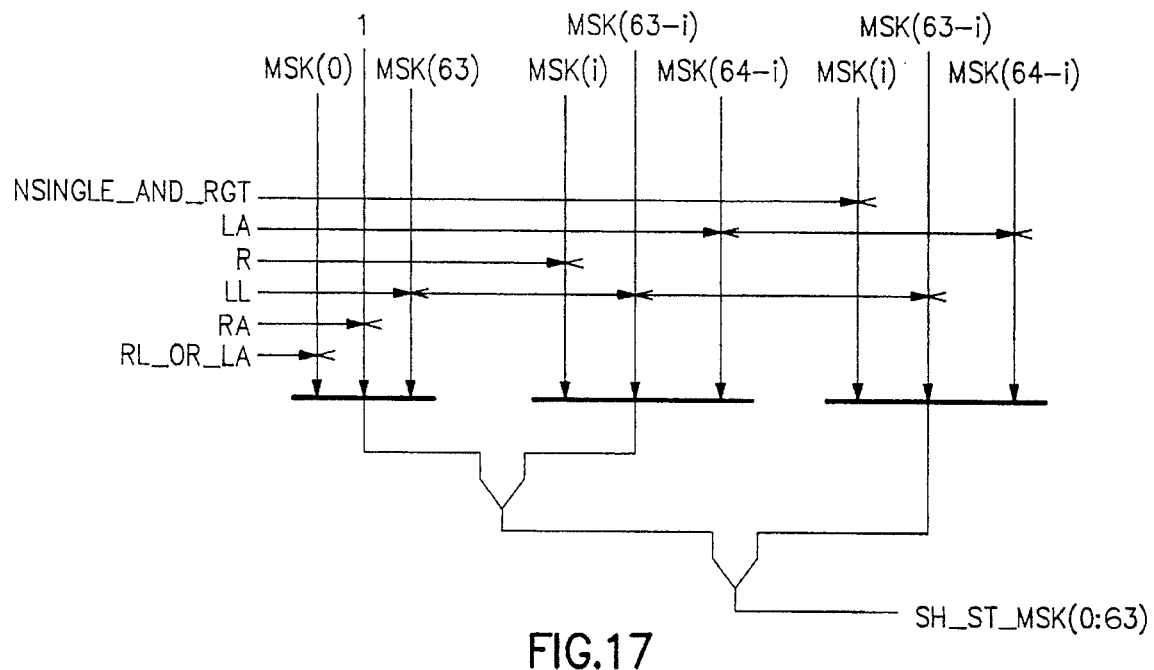
In FIG. 17 the individual mask bits generated in FIG. 2 to FIG. 16 are assembled in accordance with the shift operation to be performed by the unit into a 64 bit mask that corresponds to each bit position of the input operands that participate in the shift.
Figure 18:
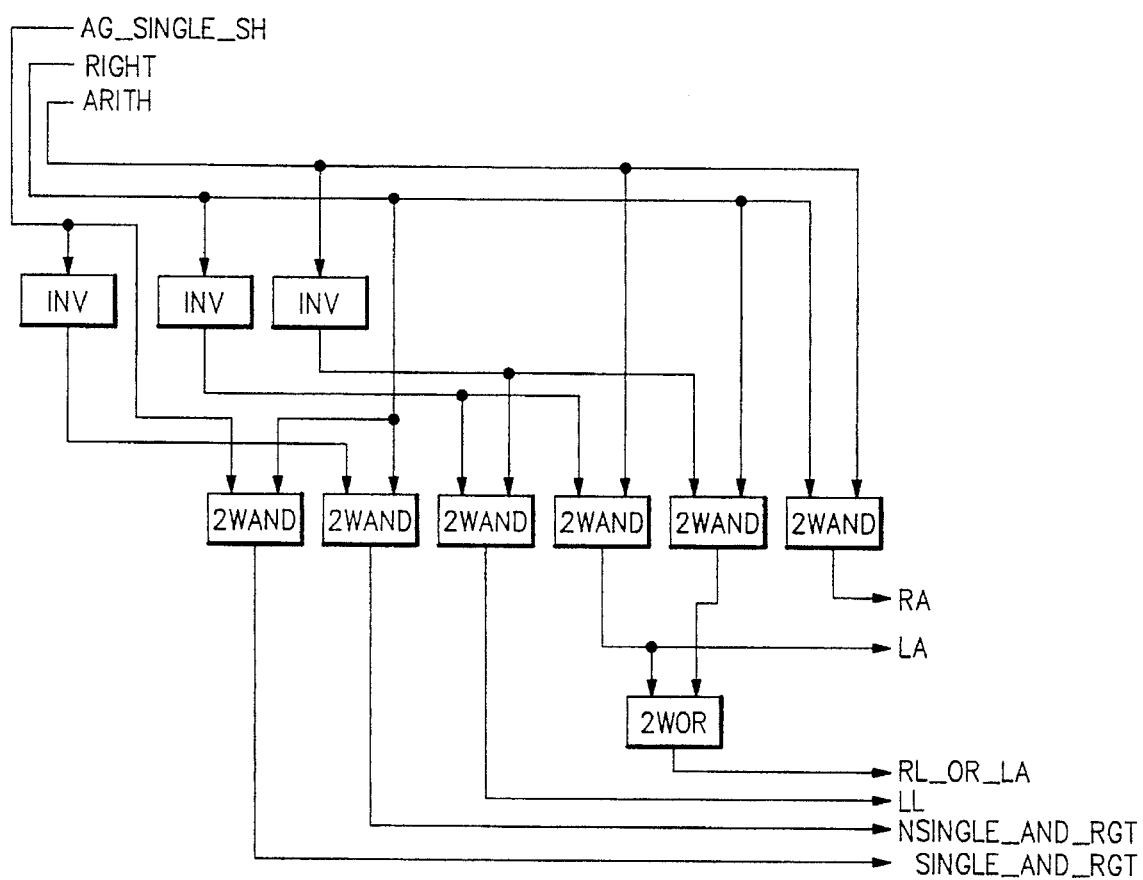
In FIG. 18 is shown decode logic for generating the control signals used in FIG. 17 to assemble the individual mask bits from FIG. 2 to FIG. 16 into the 64 bit mask of FIG. 17.

Our detailed description explains the preferred embodiments of our invention, together with advantages and features, by way of example with reference to the following drawings.

DETAILED DESCRIPTION OF THE INVENTION

Before considering our preferred embodiments in detail, it may be worthwhile to illustrate the need for our invention and to describe an example digital computing system organization in which the invention might be used. A recurring critical path in complex instruction set machines (CISC) processors is the path (often denoted as the BRANCH-LO path) in which status derived from functional units is used to determine the next microinstruction fetched from control store. The delay associated with this path, critical in scalar processors, is exacerbated in superscalar processors due to the employment of multiple parallel functional units to support the issuance of multiple machine instructions in a single cycle. This exacerbation stems from an increase in the multiplexing required to select the appropriate condition from all the status being produced by the employed functional units. Furthermore, the output of the multiplexor must then be repowered to control the selection of the next microinstruction to be loaded into the instruction register, IR. The amount of repowering that is required can also be increased by the employment of multiple functional units, especially when the machine is controlled by a horizontal microword. To reduce the delay associated with multiplexing, the multiplexor can be staged to first select among early status and subsequently select between the results of this early selection and later occurring status from functional units. As a result, it behooves the designer to produce all status from the functional units as early as possible, not only in scalar processors, but even more in superscalar processors, to facilitate the staging of the multiplexor.

The previous arguments not only apply to statuses generated in the functional units as BRANCH-LO conditions, but also to the status produced to control the flow of machine instructions. In ESA/390 these conditions set condition codes that are used by the branch unit for controlling the execution of the program via the branch on condition instruction. As for BRANCH-LO conditions, the statuses setting the condition code are produced by multiple functional units requiring multiplexing to select the appropriate status for setting the condition code. As for the BRANCH-LO conditions, the amount of multiplexing required is increased by the number of functional units employed in the design with the inherent tendency to increase the path delay. Again, the increase in path delay can be counteracted by staging the multiplexor.

A typical functional unit producing status to be used as BRANCH-LO conditions as well as for setting condition codes is the shifter. Early generation of shifter conditions, therefore, can facilitate the attainment of the desired critical path delay. In the following, our invention, a status predictor for a combined shift-rotate/merge unit, in which all of the status required of the unit is predicted is described. The invention is described assuming an ESA/390 SCISM processor organization in which up to three instructions can be issued in a single cycle. In addition, the SCISM processor is controlled by a horizontal microword having fields dedicated to the control of each of the multiple functional units. The use of multiple functional units required to support the issue of multiple instructions per cycle increases the repowering that must be performed on the output of the multiplexor to allow the selection of which of two horizontal microinstructions are to be loaded loaded into the IR. Thus, the SCISM processor provides an example of an environment where prediction of shifter status is vital to the attainment of the desired cycle time. The shifter-rotate/merge unit (henceforth referred to as shifter) employed in the SCISM processor not only executes the architected shift instructions consisting of single (32 bit) or double (64 bit), left or right, logical or arithmetic shifts, but also supports data alignment within a double word for store operations, merging of data as required for the ESA/390 mask operations ICM, CLM, and STCM, and collection and spreading of data for ESA/390 PACK and UNPACK instructions. Of these operations, ICM and all permutations of the arithmetic shifts require the shifter to produce status for setting condition codes. The use of the shifter to support more complicated ESA/390 ops leads to requirements that the shifter also produce status that allows the generation of implementation specific BRANCH-LO conditions. The shifter status requirements as well as a description of the execution of shifter operations in the SCISM processor are presented in the following section to provide a basis for describing the shifter status predictor, the subject of this invention. Before turning to the description of the execution of shift operations, however, it should be noted that our invention for predicting shifter status is not restricted to the environment chosen for its description. In fact, the environment chosen could be considered a worst case due to the shifter's support of multiple operations, especially the merging operations from which additional requirements arise for generating shifter status.

Execution of Shifter Operations in the SCISM Processor

The SCISM processor is a high performance pipelined processor. The pipeline stages include the instruction decode, ID, address generation, AG, and execution, EX, cycles. A putaway, PA, cycle subsequent to the EX cycle, is hidden via the employment of GPR bypassing. The output of nearly any functional unit executing an operation in a given cycle can be made available to nearly any of the functional units for the subsequent machine cycle. Each stage of the pipeline including PA is controlled by instruction registers designated as address generation instruction register, AIR, execution instruction register, EIR, and putaway instruction register, PIR. These instruction registers provide controls for each of the functional units executing during its cycle. For example, during the AG cycle, the addressing units perform address generation calculations; therefore, their function is controlled by the AIR. Since the shifter performs shift operations during the EX cycle, its functions are controlled by the EIR. The pipeline for microcode execution is identical to that for instruction execution except that the ID cycle is not required. Therefore, the AIR, EIR, and PIR also control the execution of microinstruction routines.

The operands on which a functional unit executes are supplied to the functional units via dedicated staging registers. For the shifter, two 32 bit staging registers are required to supply the shifter operands. These staging registers are designated as the left shift register, LSH, and the right shift register, RSH. Bit positions within these registers are enumerated from 0 to 31 starting from the left side of the register so that the most significant bit of a register corresponds to bit zero. For single shift operations, the data to be shifted is loaded in LSH while for double shift operations, both LSH and RSH are loaded with data with the MSB loaded into LSH(0).

The SCISM processor is a horizontally microcoded machine in which fields within the microword are dedicated to the control of the function to be executed as well as the supply of operands for each of the functional units operating in the EX cycle of the pipeline. Bypass logic, however, can override the selection of the source of the operand if the operand is being generated in the previous machine cycle by one of the functional units. For the shifter, the control fields in the microinstruction that are pertinent to an understanding of the shifter status predictor include:

| | |
|---|---|
| SH_OP | Which specifies the operation to be performed by the shifter |
| SH_AMOUNT | Which specifies the source of the shift amount |
| CCEXI | Which controls the posting of condition codes in the processor including those arising from shifter status |

The operations that can be specified by the SH_OP field are:

| | |
|---|---|
| RIGHTLOG | Right logical shift, pad with 0 |
| RIGHTARTH | Right arithmetic shift, pad with sign |
| LEFTLOG | Left logical shift, pad with 0, shift through bit 0 |
| LEFTARTH | Left arithmetic shift, pad with 0, preserve bit 0 |
| PACK | Pack, signed if SH_AMOUNT(1) = 1, unsigned otherwise |
| UNPACK | Unpack, signed if SH_AMOUNT(1) = 1, unsigned otherwise |
| GATHER | Gather LSH to SHO(0:31) using MMASK(0:3) |
| GATHER/ROTATE | Gather LSH using MMASK(0:3) and rotate per EA(61:63) |
| MERGE | Merge RSH with LSH to SHO(0:31) using MMASK(0:3) |
| ROTATE | Rotate per EA(61:63) |
| KMERGE | Merge RSH with LSH to SHO(0:31) using K4(0:3) |

Specification of the shift amount for the 64 bit shifter requires six bits. In the SCISM processor, this six bit shift amount, SA(0:5), can be derived from one of four sources as will be described below (note: in the text, the shift amount will be denoted as SA(0:5), whereas, in the figures, the shift amount is denoted as SH_AMT(0:5)). Choice as to which of the four sources to use is provided by the SH_AMOUNT field of the microinstruction.

Execution of ESA/390 shift operations proceeds as follows. During the ID cycle of the pipeline, the ESA/390 shift instruction is decoded with the corresponding microinstruction fetched from control store and loaded into AIR. Concurrently, ID hardware loads the staging registers that hold operands for the address generation units. Two address generation units, designated as AUO and HUO, are implemented. For ESA/390 shift instructions, either of these address generation units may be used to produce the shift amount via an address calculation. This address calculation occurs during the AG cycle of the SCISM processor. As specified in the architecture, only the six least significant bits, LSBs, of the results are used as the shift amount. The actual shift amount used may be chosen directly from the output of AUO or HUO, or from the multiplexing of their outputs to produce the effective address bus, EA. In addition, a constant field of the microinstruction can be used to specify the shift amount. As stated above, the choice of which source to use for the shift amount is provided by the SH_AMOUNT field of the microinstruction.

In addition to producing the shift amount in the AG cycle, shifter control fields of the microinstruction held in the AIR are decoded and latched into the EIR to provide explicit shifter controls early in the EX cycle. In parallel with the decode of the microinstruction to produce these shifter controls, the shifter status predictor decodes the shift amount, as will be described below, in preparation for predicting the status from the operands contained in LSH and RSH. These decodes are also latched into the EIR so as to be available immediately in the EX cycle, the cycle in which the shift operation is actually executed.

Though the above has described the procedure for executing ESA/390 shift instructions, it also applies, for the most part, to the procedure for executing shift operations as specified by a microinstruction within a macroinstruction routine. Such a microinstruction, however, has no corresponding ID cycle. For this reason, the previous microinstruction must specify the setup of the staging registers and controls for the address generation units for producing the shift amount. Otherwise, the execution of shift operations as required by a microinstruction within a macroinstruction routine is identical as for ESA/390 shifts. The shift amount and shift controls are generated and latched in the AG cycle while the shift is executed in the EX cycle.

During the EX cycle of the shift microinstruction, the BRANCH-LO conditions are used to determine which of two microinstructions will be used in the subsequent AG cycle. Also early in the cycle following the shift's EX cycle, the Branch Unit of the SCISM processor uses the condition code set from the status generated by the functional units in the EX cycle to direct the flow of the machine level program. By decoding the shift amount in the AG cycle of a shift instruction in preparation for producing shifter status, the shift status predictor allows the status to be generated immediately off the LSH and RSH staging registers. As a result, shifter status is available to the multiplexors generating BRANCH-LO conditions and condition codes early in the EX cycle of the shift allowing the design of these multiplexors to be staged as described previously.

Requirements

The statuses that must be generated by the shifter are summarized in Table 1 in conjunction with the accompanying list that defines the terms used in the table. In the table, shifter cc (SH CC) status is the architected status for the ESA/390 shift arithmetic instructions. These conditions, which must be detected for arithmetic shifts (logical shifts do not alter condition codes), consist of shifter overflow (left shifts only), result equal zero (left or right shifts), result less than zero (left or right shifts), and result greater than zero (left or right shifts). The data to be shifted is represented in 2's complement notation. The ICM cc status is imposed on the shifter because of its execution of merge operations for the ESA/390 ICM instruction. The status that must be detected for presenting condition codes for ICM include: all inserted bits zero, the left most inserted bit a one, and the left most inserted bit a zero but not all inserted bits zero. Finally, BRANCH-LO status must be generated to allow the control of the flow of microinstructions. Two BRANCH-LO conditions are required for this purpose. The first is shifter output zero, SHOHIDZ, and the second is shifter output negative, SHNEG. These BRANCH-LO conditions, however, do not have to be detected for all shift operations. The operations for which they must be valid are provided in Table 1.

| | |
|---|---|
| R-L | RIGHT-LOGICAL |
| R-A | RIGHT-ARITHMETIC |
| L-L | LEFT-LOGICAL |
| L-A | LEFT-ARITHMETIC |
| PK | PACK |
| UNPK | UNPACK |
| GTR | GATHER |
| GTRR | GATHER/ROTATE |
| MG | MERGE |
| ROT | ROTATE |
| KMG | KMERGE |
| SSHIFT | Set CC per Single Shift |
| DSHIFT | Set CC per Double Shift |
| SHIFT | Either SSHIFT or DSHIFT |
| SNOP | Do not set CC from Shift |
| NOF | Not Overflow |
| NDZ | Not zero per condition producing CC = 0 |
| SA | Shift Amount |
| U | Unpredictable |

The Preferred Embodiment

Turning now to our invention in greater detail, FIG. 1 shows the use of our invention in a digital computer system. On the upper left of FIG. 1 are shown signals from instruction setup and decode, well known to the art, feeding a shifter control generator where 14 controls for the status predictor are produced. In the upper portion of FIG. 1, the appropriate status mask for predicting status, RMU_ST_MSK(0:63), is produced as operands for the shifter are fetched from GPR into staging registers, LSH(0:31) and RSH(0:31). The mask, RMU_ST_MSK(0:63), along with controls ARITH and RIGHT are also latched into staging registers EIR_RMU_ST_MSK(0:63), EIR_ARITH, and EIR_RIGHT, respectively. In the execution cycle, EIR_RMU_ST_MSK(0:63) is applied directly to the operands, LSH(0:31) and RSH(0:31), under the control of EIR_ARITH and EIR_RIGHT, to predict status directly from the inputs by means of the status generator shown in the lower portion of FIG. 1, making the status available early in the execution cycle.

In the following, prediction of each of the statuses is described in greater detail. For each of the statuses, a brief summary of the requirements and setup of the shifter is presented. Following this, the logic for predicting the status is described with logic diagrams provided as required. First, the prediction of result equal zero is presented. Following this, the prediction that all inserted bits are zero, as required for the merge and kmerge shift operations, is described. This is followed by a description of the prediction of shifter overflow, result less than zero, result greater than zero, left most inserted bit a one, and finally the left most inserted bit a zero and not all inserted bits zero. Generation of this status covers all of the requirements shown in the preceding section.

Result Equal Zero

Result Equal Zero must be detected for single or double, left or right, arithmetic shifts for posting condition codes as

TABLE 1

Shifter Status for Possible Shifter Operation/Operand Specifications

| Shift Op | CCEXI | SHOHIDZ | SHNEG | ICM CC | | | SH CC | | | |
|---|---|---|---|---|---|---|---|---|---|---|
| | | | | 0 | 1 | 2 | 0 | 1 | 2 | 3 |
| R-L | SNOP | SHO(0:63) = 0 | LSH(0) = 1 & SA = 0 | — | — | — | — | — | — | — |
| R-A | SSHIFT | SHO(0:31) = 0 | LSH(0) = 1 | — | — | — | SHO (0:31) = 0 | LSH (0) = 1 | LSH (0) = 0 & NDZ | 0 |
| R-A | DSHIFT | SHO(0:63) = 0 | LSH(0) = 1 | — | — | — | SHO (0:63) = 0 | LSH (0) = 1 | LSH (0) = 0 & NDZ | 0 |
| R-A | SNOP | SHO(0:63) = 0 | LSH(0) = 1 | — | — | — | — | — | — | — |
| L-L | SNOP | SHO(0:63) = 0 | SHO(0) = 1 | — | — | — | — | — | — | — |
| L-A | SHIFT | SHO(0:63) = 0 | LSH(0) = 1 | — | — | — | NOF & SHO (0:63) = 0 | NOF & LSH (0) = 1 | NOF & LSH(0) = 0 & NDZ | BITS LOST ≠ LSH(0) |
| L-A | SNOP | SHO(0:63) = 0 | LSH(0) = 1 | — | — | — | — | — | — | — |
| PK | SNOP | — | — | — | — | — | — | — | — | — |
| UNPK | SNOP | — | — | — | — | — | — | — | — | — |
| GTR | SNOP | — | — | — | — | — | — | — | — | — |
| GTRR | SNOP | — | — | — | — | — | — | — | — | — |
| MG | ICM | SHO(0:31) = 0 | u | INS BITS = 0 | LFT INS BIT = 1 | LFT INS BIT = 0 & NDZ | — | — | — | — |
| ROT | SNOP | — | — | — | — | — | — | — | — | — |
| KMG | SNOP | SHO(0:31) = 0 | — | — | — | — | — | — | — | — | well for double, left or right, logical shifts for establishing BRANCH-LO conditions. SHOHIDZ must also be detected for MERGE and KMERGE operations. A discussion of the prediction of SHOHIDZ for MERGE and KMERGE will be deferred until following a discussion of the prediction of all inserted bits zero for these operations. Prediction of result equal zero for the shift operations is accomplished by first decoding the shift amount to produce a mask specifying which bits of the input data will appear at the output of the shifter once the shift operation is executed. To clarify the process and the requirements for producing the appropriate mask, consider the determination of result equal zero for an eight bit shifter. For this shifter, a double shift represents an eight bit shift while a single shift represents a four bit shift. For convenience, the input to the shifter will be viewed as left and right nibbles with the left nibble representing the most significant bits, MSB, of the data. It is assumed that these two nibbles can be loaded independently. A reference to the shifter input data will designate both the left and right nibbles of data for a double shift but only the left most nibble for a single shift. When executing a logical shift, all bits of the input data partake in the shift; for an arithmetic shift, all bits except the sign bit, the MSB, participate in the shift. For logical shifts and arithmetic left shifts, zeros are supplied to the vacated bit positions of the shifter. For right arithmetic shifts, the sign bit is supplied to the vacated bit positions of the shifter. The desired mask for these operations can be produced by decoding the shift amount to indicate which bits of the input will appear at the output of the shifter following the shift operation. For the eight bit shifter, the shift amount is specified by three bits, SA(0:2), with a shift amount of zero, SA(0:2)='000'b, meaning a shift of zero, a shift amount of one, SA(0:2)='001'b, representing a one bit shift, etc. The mask for predicting result equal zero for each case is described below. Though right logical shifts do not post condition codes, the mask for predicting double, right, logical shifts is included to allow the prediction of the SHOHIDZ BRANCH-LO condition for this operation.

Result Equal Zero Mask for Double Right Logical and Arithmetic Shifts

The truth table for generating a mask having ones corresponding to the shifter input bits that appear at the output of the shifter following a double right logical shift is shown in the following example.

| SA (0) | SA (1) | SA (2) | M (0) | M(1) | M (2) | M(3) | M(4) | M(5) | M(6) | M(7) |
|---|---|---|---|---|---|---|---|---|---|---|
| 0 | 0 | 0 | 1 | 1 | 1 | 1 | 1 | 1 | 1 | 1 |
| 0 | 0 | 1 | 1 | 1 | 1 | 1 | 1 | 1 | 1 | 0 |
| 0 | 1 | 0 | 1 | 1 | 1 | 1 | 1 | 1 | 0 | 0 |
| 0 | 1 | 1 | 1 | 1 | 1 | 1 | 1 | 0 | 0 | 0 |
| 1 | 0 | 0 | 1 | 1 | 1 | 1 | 0 | 0 | 0 | 0 |
| 1 | 0 | 1 | 1 | 1 | 1 | 0 | 0 | 0 | 0 | 0 |
| 1 | 1 | 0 | 1 | 1 | 0 | 0 | 0 | 0 | 0 | 0 |
| 1 | 1 | 1 | 1 | 0 | 0 | 0 | 0 | 0 | 0 | 0 |

As stated above, all bits participate in a logical shift. For a shift amount of zero, all of the input bits will appear at the output of the shifter; therefore, all of the mask bits, M(0:7), for the corresponding row of the table are ones (note: in the text, the mask is denoted as M(x); in the figures the mask is denoted as MSK(x)). For a shift amount of one, SA(0:2)= 001, the data is shifted right one position so that the right most bit of data is lost while the remaining seven bits appear at the output of the shifter. As a result, M(0:6) for the corresponding row of the table are ones with M(7) a zero. Continuing this line of reasoning leads to the truth table shown in the above example. The above truth table is also applicable to arithmetic shifts since the MSB of the input always appears at the output of the shifter as can be seen in the truth table. An important characteristic of the above truth table is that the ones in the table occupy adjacent positions. This adjacency of ones allows a large amount of minimization to occur when designing the logic required to produce the mask. This adjacency of ones carries over to the truth table for generating the mask for the 64 bit shifter required by the SCISM application. It is this adjacency with the attendant logic minimization that makes the generation of the mask feasible for this shifter.

Result Equal Zero Mask for Single Right Arithmetic Shifts

A truth table for single right logical shifts is not required since these instructions do not post conditions codes and a BRANCH-LO indication for these shifts is not required. Single right arithmetic shifts, however, do post condition codes. The truth table presented in the previous section for double right shifts does not suffice for single shifts because the right boundary for single shifts is moved from the right edge to the middle of the shifter. The truth table for specifying the mask generation for single arithmetic right shifts is as follows:

| SA (0) | SA (1) | SA (2) | M (0) | M(1) | M (2) | M(3) | M(4) | M(5) | M(6) | M(7) |
|---|---|---|---|---|---|---|---|---|---|---|
| 0 | 0 | 0 | 1 | 1 | 1 | 1 | 0 | 0 | 0 | 0 |
| 0 | 0 | 1 | 1 | 1 | 1 | 0 | 0 | 0 | 0 | 0 |
| 0 | 1 | 0 | 1 | 1 | 0 | 0 | 0 | 0 | 0 | 0 |
| 0 | 1 | 1 | 1 | 0 | 0 | 0 | 0 | 0 | 0 | 0 |
| 1 | 0 | 0 | 1 | 0 | 0 | 0 | 0 | 0 | 0 | 0 |
| 1 | 0 | 1 | 1 | 0 | 0 | 0 | 0 | 0 | 0 | 0 |
| 1 | 1 | 0 | 1 | 0 | 0 | 0 | 0 | 0 | 0 | 0 |
| 1 | 1 | 1 | 1 | 0 | 0 | 0 | 0 | 0 | 0 | 0 |

For a shift of zero, all of the bits of the left nibble are presented at the output of the shifter; the bits of the right nibble do not participate in the shift. For a right shift of one, the right most bit of the input data, the left nibble, is lost while the remaining bits of the input appear at the output of the shifter; hence M(3) is a zero while M(0:2) are ones. This line of reasoning continues until a shift amount of four or greater is specified. For these shift amounts all bits of the data would be lost for logical shifts. For arithmetic shifts, however, the sign bit is always retained in the MSB position of the shifter output; therefore, M(0) is one for all of the shift amounts.

Result Equal Zero Mask for Left Logical Shifts.

The truth table for double, left, logical shift operations is shown in the following example. As has been stated, logical shift operations do not post a condition code. The following table, however, is required to predict result equal zero for BRANCH-LO conditions.

| SA (0) | SA (1) | SA (2) | M (0) | M(1) | M (2) | M(3) | M(4) | M(5) | M(6) | M(7) |
|---|---|---|---|---|---|---|---|---|---|---|
| 0 | 0 | 0 | 1 | 1 | 1 | 1 | 1 | 1 | 1 | 1 |
| 0 | 0 | 1 | 0 | 1 | 1 | 1 | 1 | 1 | 1 | 1 |
| 0 | 1 | 0 | 0 | 0 | 1 | 1 | 1 | 1 | 1 | 1 |
| 0 | 1 | 1 | 0 | 0 | 0 | 1 | 1 | 1 | 1 | 1 |

-continued

| SA (0) | SA (1) | SA (2) | M (0) | M(1) | M (2) | M(3) | M(4) | M(5) | M(6) | M(7) |
|---|---|---|---|---|---|---|---|---|---|---|
| 1 | 0 | 0 | 0 | 0 | 0 | 0 | 1 | 1 | 1 | 1 |
| 1 | 0 | 1 | 0 | 0 | 0 | 0 | 0 | 1 | 1 | 1 |
| 1 | 1 | 0 | 0 | 0 | 0 | 0 | 0 | 0 | 1 | 1 |
| 1 | 1 | 1 | 0 | 0 | 0 | 0 | 0 | 0 | 0 | 1 |

As for the right logical shifts with a shift amount of zero, all inputs to the shifter will appear at the output following the shift. Therefore, all of the mask bits for this shift amount are ones. For other shift amounts, the reasoning used for justifying the table is identical to that for double right logical shifts except that the direction of the shift is in the opposite direction. As a result, zeros are introduced starting at M(0) rather than M(7). It can be seen that the resulting truth table is the mirror image of the truth table obtained for double right logical shifts. Use will be made of this characteristic in the following to simplify the design of the mask generation logic. If the contents of RSH is restricted to be zero when executing a single, left, logical shift, the above truth table is sufficient for predicting result equal zero for all left logical shifts.

Result Equal Zero Mask for Left Arithmetic Shifts

The truth table for specifying the generation of result equal zero for left arithmetic shifts is similar to those for left logical shifts with the following exceptions. First, the MSB of the data is always selected for output from the shifter, ie. M(0) is always one, and second, the insertion of zero starts from M(1) rather than from M(0). The resulting truth table is:

| SA (0) | SA (1) | SA (2) | M (0) | M(1) | M (2) | M(3) | M(4) | M(5) | M(6) | M(7) |
|---|---|---|---|---|---|---|---|---|---|---|
| 0 | 0 | 0 | 1 | 1 | 1 | 1 | 1 | 1 | 1 | 1 |
| 0 | 0 | 1 | 1 | 0 | 1 | 1 | 1 | 1 | 1 | 1 |
| 0 | 1 | 0 | 1 | 0 | 0 | 1 | 1 | 1 | 1 | 1 |
| 0 | 1 | 1 | 1 | 0 | 0 | 0 | 1 | 1 | 1 | 1 |
| 1 | 0 | 0 | 1 | 0 | 0 | 0 | 0 | 1 | 1 | 1 |
| 1 | 0 | 1 | 1 | 0 | 0 | 0 | 0 | 0 | 1 | 1 |
| 1 | 1 | 0 | 1 | 0 | 0 | 0 | 0 | 0 | 0 | 1 |
| 1 | 1 | 1 | 1 | 0 | 0 | 0 | 0 | 0 | 0 | 0 |

As for left logical shifts, this truth table can be used for both double and single shifts if the contents of RSH for single, left, arithmetic shifts is restricted to always be zero. Comparison of this truth table with that for left, logical shifts reveals that the table for left, arithmetic shifts can be produced from the left, logical shift table by rotating the table left one bit position. This characteristic is used in the following section to simplify the design for generating the result equal zero mask.

Generation of the Result Equal Zero Mask

In the above sections, it was observed that the truth table for specifying the generation of the result equal zero mask for left, logical shifts was the mirror image of that for specifying the generation of the mask for double, right shifts. In addition, it was observed that the table for generating the mask for left, arithmetic shifts could be obtained by rotating left the table for generating the mask for left, logical shifts. As a result of these observations, these three tables can be generated by decoding the shift amount per the table specifying the mask generation for double, right shifts and then either using the mask directly, or doing one of two operations on the mask. Let the mask generated by the decode of the shift amount at bit position i be designated as M(i). Let the ultimate mask at bit position i for determining result equal zero be designated as SH_ST_MSK(i). Using this notation, SH_ST_MSK(i) for left, logical shifts can be generated by substituting M(7-i) for M(i) at bit position i. Similarly, SH_ST_MSK(i) for left, arithmetic shifts can be produced by retaining M(0) at bit position zero while substituting M(8-i) for M(i) for bit positions 1≤i≤7. This substitution can be accomplished by employing an appropriately controlled multiplexor. As a result the shift amount decode requirements have been reduced to two table specifications. First, the shift amount must be decoded according to the requirements for double, right shifts. Second, the shift amount must be decoded to produce M(0:7) in accordance with the truth table for single, right, arithmetic shifts. These two tables can be merged to produce the shift amount decode requirements for producing the result equal zero mask. The truth table resulting from this merging is:

| RS | SA (0) | SA (1) | SA (2) | M (0) | M(1) | M (2) | M(3) | M (4) | M(5) | M (6) | M(7) |
|---|---|---|---|---|---|---|---|---|---|---|---|
| 0 | 0 | 0 | 0 | 1 | 1 | 1 | 1 | 1 | 1 | 1 | 1 |
| 0 | 0 | 0 | 1 | 1 | 1 | 1 | 1 | 1 | 1 | 1 | 0 |
| 0 | 0 | 1 | 0 | 1 | 1 | 1 | 1 | 1 | 1 | 0 | 0 |
| 0 | 0 | 1 | 1 | 1 | 1 | 1 | 1 | 1 | 0 | 0 | 0 |
| 0 | 1 | 0 | 0 | 1 | 1 | 1 | 1 | 0 | 0 | 0 | 0 |
| 0 | 1 | 0 | 1 | 1 | 1 | 1 | 0 | 0 | 0 | 0 | 0 |
| 0 | 1 | 1 | 0 | 1 | 1 | 0 | 0 | 0 | 0 | 0 | 0 |
| 0 | 1 | 1 | 1 | 1 | 0 | 0 | 0 | 0 | 0 | 0 | 0 |
| 1 | 0 | 0 | 0 | 1 | 1 | 1 | 1 | 0 | 0 | 0 | 0 |
| 1 | 0 | 0 | 1 | 1 | 1 | 1 | 0 | 0 | 0 | 0 | 0 |
| 1 | 0 | 1 | 0 | 1 | 1 | 0 | 0 | 0 | 0 | 0 | 0 |
| 1 | 0 | 1 | 1 | 1 | 0 | 0 | 0 | 0 | 0 | 0 | 0 |
| 1 | 1 | 0 | 0 | 1 | 0 | 0 | 0 | 0 | 0 | 0 | 0 |
| 1 | 1 | 0 | 1 | 1 | 0 | 0 | 0 | 0 | 0 | 0 | 0 |
| 1 | 1 | 1 | 0 | 1 | 0 | 0 | 0 | 0 | 0 | 0 | 0 |
| 1 | 1 | 1 | 1 | 1 | 0 | 0 | 0 | 0 | 0 | 0 | 0 | in which the column RS has been added to indicate a single, right, arithmetic shift. For an RS of zero, the table corresponds to that for double, right shifts; for RS of one, the table corresponds to that for single, right shifts. For all left shift operations, RS would be zero. The multiplexing following the decode of the shift amount required to generate SH_ST_MSK can be used to alter the above truth table to allow a further minimization in the decode logic. For single, right shifts, M(4:7) produced by the decode is selected to produce SH_ST_MSK(4:7). M(4:7), however, is always zero. Therefore, the mux controls could be designed to deselect all legs of the mux when RS is one; thereby, forcing SH_ST_MSK(4:7) to zero. The production of M(4:7) for these conditions then becomes a don't care. The truth table produced by making these don't cares is (d=don't care):

| RS | SA (0) | SA (1) | SA (2) | M (0) | M(1) | M (2) | M(3) | M (4) | M(5) | M (6) | M(7) |
|---|---|---|---|---|---|---|---|---|---|---|---|
| 0 | 0 | 0 | 0 | 1 | 1 | 1 | 1 | 1 | 1 | 1 | 1 |
| 0 | 0 | 0 | 1 | 1 | 1 | 1 | 1 | 1 | 1 | 1 | 0 |
| 0 | 0 | 1 | 0 | 1 | 1 | 1 | 1 | 1 | 1 | 0 | 0 |
| 0 | 0 | 1 | 1 | 1 | 1 | 1 | 1 | 1 | 0 | 0 | 0 |
| 0 | 1 | 0 | 0 | 1 | 1 | 1 | 1 | 0 | 0 | 0 | 0 |
| 0 | 1 | 0 | 1 | 1 | 1 | 1 | 0 | 0 | 0 | 0 | 0 |
| 0 | 1 | 1 | 0 | 1 | 1 | 0 | 0 | 0 | 0 | 0 | 0 |
| 0 | 1 | 1 | 1 | 1 | 0 | 0 | 0 | 0 | 0 | 0 | 0 |
| 1 | 0 | 0 | 0 | 1 | 1 | 1 | 1 | d | d | d | d |
| 1 | 0 | 0 | 1 | 1 | 1 | 1 | 0 | d | d | d | d |
| 1 | 0 | 1 | 0 | 1 | 1 | 0 | 0 | d | d | d | d |

| RS | SA (0) | SA (1) | SA (2) | M (0) | M(1) | M (2) | M(3) | M (4) | M(5) | M (6) | M(7) |
|---|---|---|---|---|---|---|---|---|---|---|---|
| 1 | 0 | 1 | 1 | 1 | 0 | 0 | 0 | d | d | d | d |
| 1 | 1 | 0 | 0 | 1 | 0 | 0 | 0 | d | d | d | d |
| 1 | 1 | 0 | 1 | 1 | 0 | 0 | 0 | d | d | d | d |
| 1 | 1 | 1 | 0 | 1 | 0 | 0 | 0 | d | d | d | d |
| 1 | 1 | 1 | 1 | 1 | 0 | 0 | 0 | d | d | d | d |

This truth table specifies the decoding of the shift amount that must be performed to allow the prediction of result equal to zero for an eight bit shifter. This table must be expanded to allow the prediction of result equal to zero for a 64 bit shifter. The expansion produces a table with seven inputs (six shift amount bits and a right single designator) and 64 outputs (the 64 bit mask, M(0:63)). As has been stated, the ones occurring in the table are adjacent allowing a large amount of logic minimization to occur. This adjacency of ones allows the implementation to be feasible.

The shift amount decode logic and subsequent multiplexing to produce SH_ST_MSK(0:63) for the SCISM shifter is shown in FIG. 2 to FIG. 18. The signals used in these figures are:

| | |
|---|---|
| SH_AMT(0:5) | The shift amount (also NSH_AMT(0:5) - negative polarity) |
| SINGLE_AND_RGT | Indicates a right single shift (also NSINGLE_AND_RGT - negative polarity) operation |
| LA | Indicates a left arithmetic shift operation |
| R | Indicates a right shift operation |
| LL | Indicates a left logical shift operation |
| RA | Indicates a right arithmetic shift operation |
| RL_OR_LA | Indicates a right logical or left arithmetic shift operation |

Shifter Result Equal Zero Prediction

SH_ST_MSK(0:63) is calculated in the AG cycle, and, referring to FIG. 1, is gated through STATUS MASK SELECTOR when the operation is a shift and latched in EIR_RMU_ST_MSK(0:63) at the beginning of the EX cycle. EIR_RMU_ST_MSK(0:63) can then be applied against the input to the shifter to predict result equal zero. This is accomplished by bitwise NANDing the input to the shifter at a given bit position with the corresponding input data at that bit position following by a 63 way AND of the results of the bitwise NAND. This logic is included in FIG. 19. The inputs to the shifter are denoted by LSH(0:31) and RSH(0:31), the left and right inputs to the shifter. These inputs correspond to the left and right nibbles for the eight bit shifter assumed above. The prediction logic consists of the two X32 2WAND blocks that are fed with EIR_RMU_ST_MSK(0:63) and LSH(0:31) and RSH(0:31), the outputs of which feed two X32 INV (inverter) blocks which feed two 32WAND blocks. The outputs of the 32WAND blocks are subsequently ANDed to produce a signal, SHOHIDZ, indicating that the result is zero. To comply with the architected condition code, the output of the 2WAND is then ANDed with a signal indicating that the shifter did not produce an overflow. The results of the final AND produces shifter condition code zero, SH_CC_(0). A description of the prediction of shifter overflow is deferred to a later section.

All Inserted Bits Zero

In addition to executing shifts, the shifter also merges selected bytes from storage into byte positions of a GPR as specified by a four bit mask field within the ICM ESA/390 instruction. The shifter, therefore, must generate status for setting the condition codes as architected for this instruction. One status that must be determined for this instruction is the detection that all inserted bits are zero. Before the prediction of this status can be described, an understanding of the shifter operation to accomplish the execution of the instruction is required.

To execute the ICM instruction, LSH(0:31) is loaded with the GPR data into which selected bytes from storage are to be inserted. Meanwhile, a storage fetch is issued to the L1 data cache requesting that a number of storage bytes equivalent to the number of ones in the mask be fetched from storage and provided right aligned on an eight byte storage bus. This data is then loaded into RSH(0:31) with the data appearing right aligned in the register. For example, if the mask is '1010'b, then a storage fetch request for two bytes of data would be issued to the L1 data cache. The data would be placed on the eight byte storage bus as 'uuuuuuuuuuuuaabb'X in which aa and bb represent the first and second bytes of the storage data, respectively, and u indicates that the contents are unpredictable. The right four bytes of the bus would then be fed into the RSH appearing as 'uuuuaabb'X. The shifter then merges this data with the GPR data in LSH(0:31) by passing bytes from LSH to outputs SHO(0:31) of the shifter when the corresponding four bit mask is a zero while spreading bytes from the RSH register to corresponding byte positions within SHO(0:31) whose corresponding four bit mask is one. Continuing the above example, if the data in LSH(0:31) is 'eeffgghh'X, the SHO(0:31) contains 'aaffbbhh'X following the execution of ICM.

Prediction of all inserted bits zero requires the generation of a 32 bit mask, ICM_ST_MSK(32:63), to be generated specifying which bits of RSH(0:31) will appear at the output of the shifter following the execution of ICM. If this mask is expanded to ICM_ST_MSK(0:63) to specify which bits of LSH and RSH will appear at the output, the mask can also be applied against these registers to produce SHOHIDZ for this operation. In this case, SHOHIDZ indicates that SHO(0:31) of the shifter is zero. The SH_OP operations for which ICM_ST_MSK is useful includes MERGE, which is specified for executing ICM, and KMERGE which is used by a microinstruction to mimic the operation of an ICM. SHOHIDZ is valid for both operations while all inserted bits zero is required by the MERGE operation to produce an architected condition code for the ICM instruction.

Figure 20:
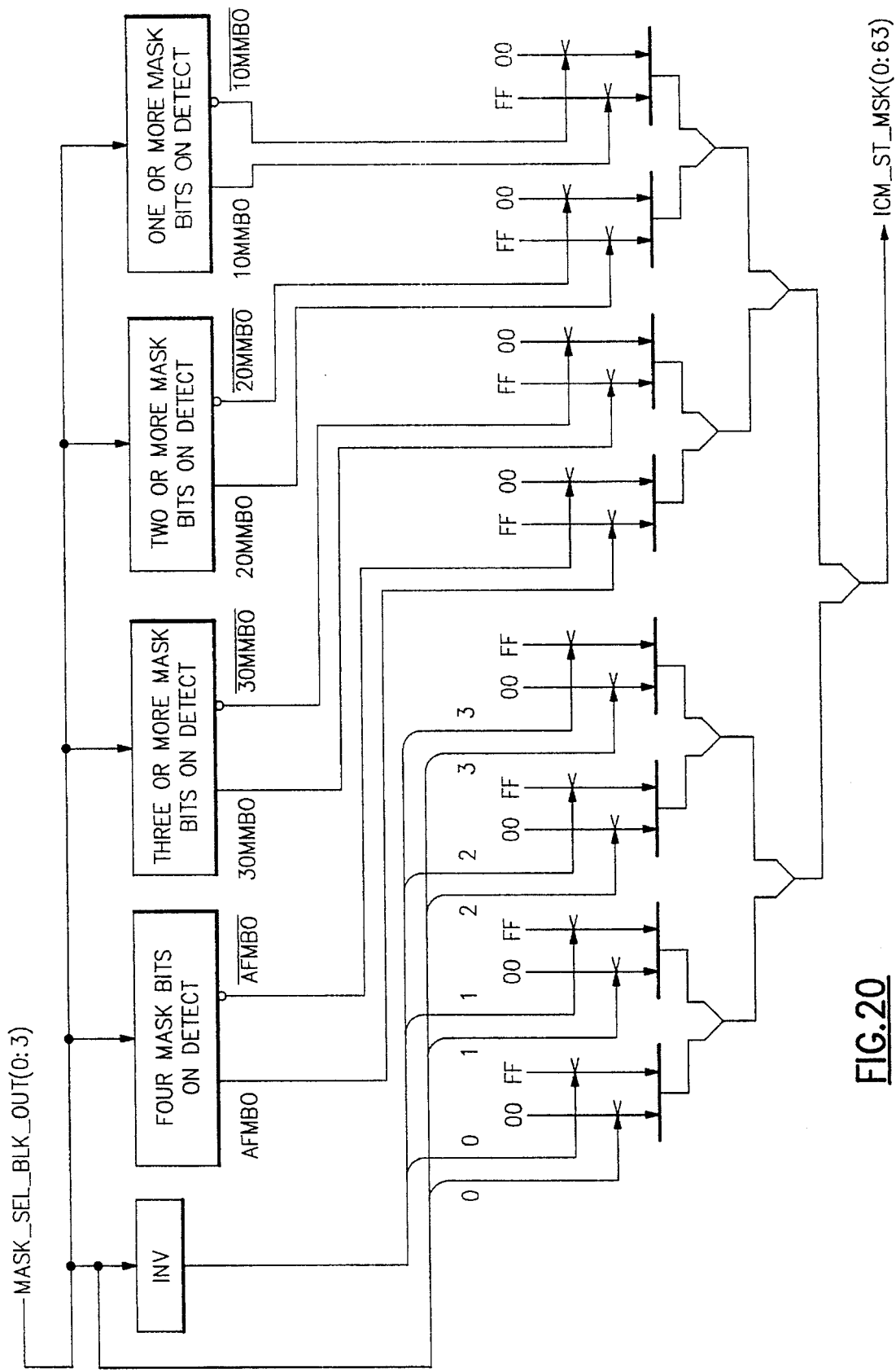
In FIG. 20 is shown logic for generating a 64 bit mask that, when substituted as the 64 bit mask of FIG. 19 for applying against the input operands, produce all status required by the ESA/390 ICM instruction.

ICM_ST_MSK(0:63) can be easily produced by decoding the four bit mask used to control the merging operation. For the MERGE operation, this four bit mask is derived from a mask in the ICM instruction while for KMERGE it is derived from a constant field within the microinstruction. The bits of the four bit mask correspond to byte positions within the GPR with the left most bit associated with the left most byte of the GPR. The resulting mask is decoded to produce a 'FF'X at any byte position within ICM_ST_MSK(0:31) whose corresponding bit within the four bit mask is a zero and a '00'x at any byte position whose corresponding bit is a one. To produce ICM_ST_MSK(32:63), the four bit mask is decoded to produce 'FF'X or '00'X at any byte position according to the decode shown in FIG. 20.

ICM_ST_MSK, which is calculated in the AG cycle, is required for producing shifter status for MERGE and KMERGE shifter operations. For these operations, SH_ST_MSK, used for generating status for shift operations is not required. For shift operations, ICM_ST_MSK is not required; therefore, SH_ST_MSK and ICM_ST_MSK are multiplexed to produce RMU ST MSK (see FIG. 1), which is latched in EIR_RMU_ST_MSK(0:63) at the beginning of the EX cycle and is actually used to generate shifter status. The generation of all inserted bits zero is accomplished by a bitwise NAND between EIR_RMU_ST_MSK(32:63) and RSH(0:31) followed by a 32 way AND between the resulting signals. This logic, shown in FIG. 19, consists of the X32 2WAND, X32 INV, and 32WAND producing ICM_CC_(0) in the figure. This logic is also used for predicting result equal zero as described in the previous section.

SHOHIDZ for MERGE and KMERGE operations

Figure 19B:
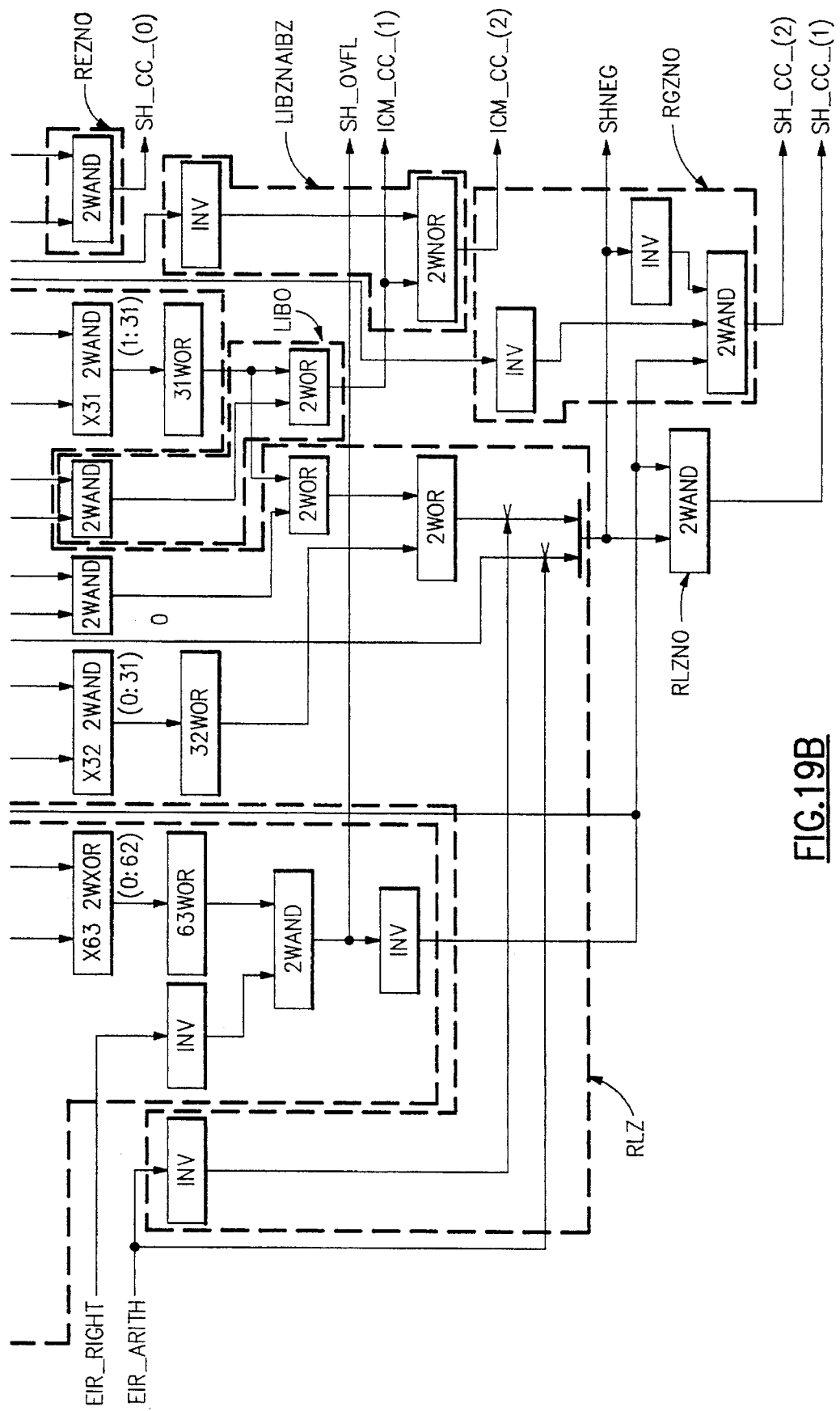
In FIG. 19 is shown the application of a 64 bit mask to the input operands of the combined shift and rotate/merge unit to produce all status that is to be generated by the combined shift-rotate/merge unit. For shift operations, the 64 bit mask of FIG. 17 would be used as the mask for generating this status.

Prediction of the BRANCH-LO condition that result equal zero, SHOHIDZ, is identical to the generation of SHOHIDZ for shift operations with EIR_RMU_ST_MSK(0:63) being produced from ICM_ST_MSK(0:63). This is also shown in FIG. 19.

Overflow

Shifter overflow must only be detected for left arithmetic shift operations. This condition is determined by detecting that a bit shifted out of the shifter is different from the sign bit, ie. the MSB of the input data. Because the result equal zero mask indicates which of the bits input to the shifter will remain at the output and which will be lost, this mask can be used for predicting shifter overflow. The bits lost from the shifter are indicated by zeros in the mask. The use of the mask to predict shifter overflow is included in FIG. 19. The overflow prediction logic consists of repowering the MSB of the input to the shifter, the X63 INV block for executing a bitwise inversion of the result equal zero mask, the gating of the repowered MSB of the input along with the remaining input bits into a bitwise X63 2WXOR block for comparing the bits selected by the inverted mask with the MSB of the input, followed by a 63 way OR (63WOR) block for reducing the bitwise comparison to a single signal indicating whether any of the bits lost from the shifter differ from the MSB of the input. This single overflow signal is then gated with a signal indicating that a left shift is being executed to produce SH OVFL, shifter overflow. The signal indicating a left shift is produced by the inversion of EIR_RIGHT, a signal indicating a right shift that is produced from a decode of the SHOP field of the microinstruction. As mentioned previously, the inversion of the shifter overflow signal is used to gate SHOHIDZ to produce the architecturally compliant condition code, SH_CC_(0), for indicating result equal zero. It is also used to gate the signals for producing architecturally compliant condition codes for indicating result less than zero and result greater than zero.

Result Less Than Zero

Prediction of result less than zero for arithmetic shifts is trivial since the sign bit of the input is retained as the sign bit of the output for these shift operations. All that is required is to detect that the MSB of the input is a one. In FIG. 19 this is accomplished by the left leg of the multiplexor producing SHNEG. The left leg of the multiplexor is fed the MSB of the input to the shifter, LSH(0), and is selected by a signal indicating that an arithmetic shift operation is being executed. SHNEG is then gated by the inverse of SH_OVFL to produce the architecturally correct shift result less than zero condition code, SH_CC_(1).

The alternate leg of the multiplexor, is used to predict shifter status for logical shift operations. This status, SHNEG, is used as a BRANCH-LO condition for controlling the sequencing of microinstructions. As for arithmetic shifts, SHNEG should be posted if the sign bit, ie MSB, of the output from the shifter is a one. For these operations, however, the MSB of the input participates in the shift and is not retained as the MSB of the output. Prediction of result less than zero for these operations requires that the left most bit of the result be determined.

The mask generated for predicting result equal zero can be used to predict SHNEG for logical shifts. From this mask, the bit that will appear as the left most bit must be determined. For left logical shifts any of the bits in LSH or RSH may become the MSB of the output. The result equal zero mask generated for left logical shifts, however, consists of either all ones, or a string of zero's followed by a string of one's. As a result, the problem of determining the input that will become the MSB of the output reduces to finding the left edge of the string of ones. This is the purpose of the left edge detect logic block of FIG. 19.

Figure 21:
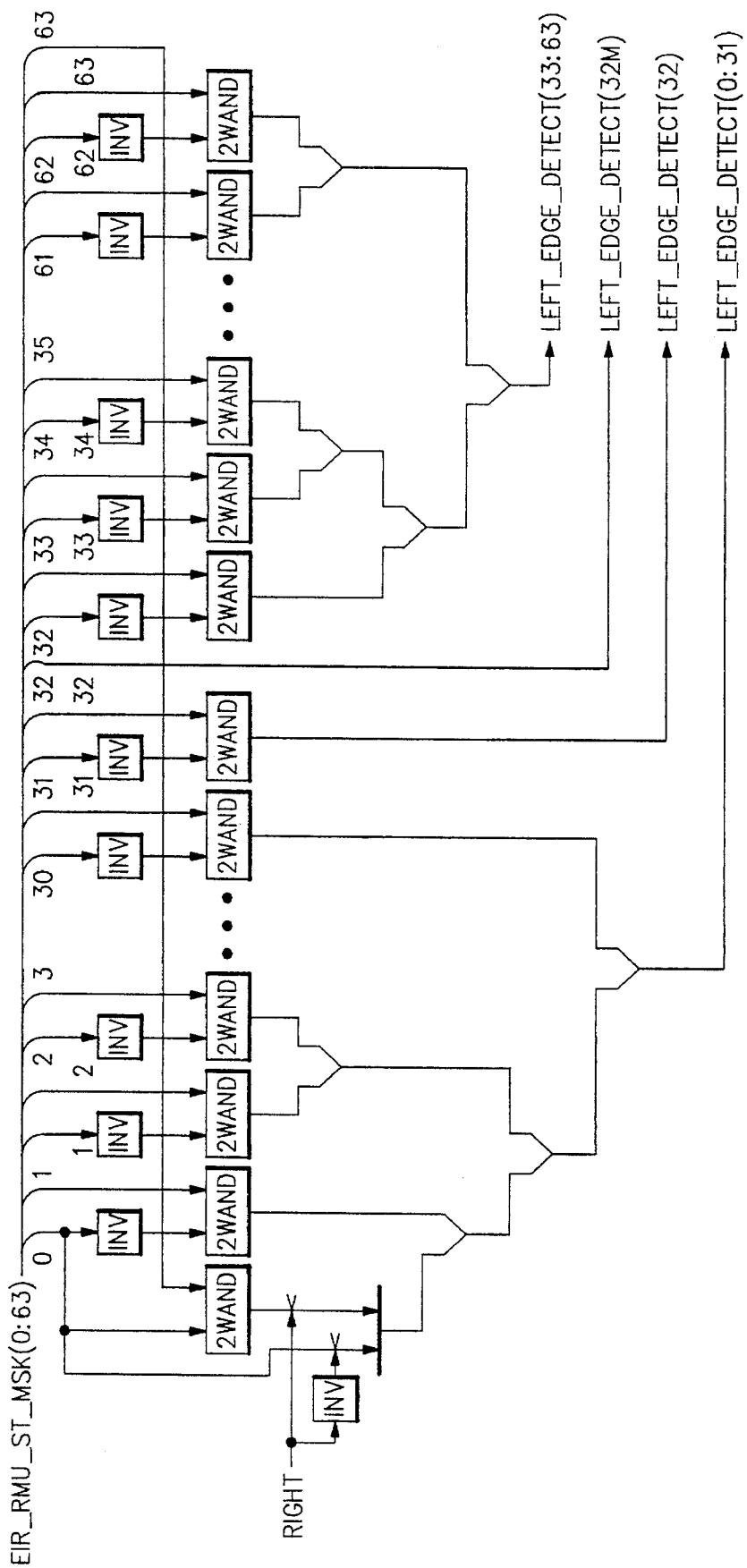
In FIG. 21 the LEFT_EDGE_DETECT logic of FIG. 19 is expanded to show the generation of a 64 bit result in which all of the bits are a logic zero except for the bit position corresponding to the left most bit position of the mask to be applied to the input operands for generating status that contains a logic one.

The left edge detection box is further described in FIG. 21. LEFT_EDGE_DETECT(0:63) produced by this box is used to predict SHNEG for left logical shifts. LEFT_EDGE_DETECT(32M) also produced by the box is substituted for LEFT_EDGE_DETECT(32) when generating a mask used to detect that the left most inserted bit is a one. The result produced in this fashion, used to predict architected condition codes when executing ICM, will be considered later. For left shifts, the logic for detecting that the left edge is at bit position i for $1 \leq i \leq 63$ consists of inverting the mask bit at i-1 followed by the ANDing of this inverted bit with the mask bit at i. For the mask pattern of a string of all zero's followed by all ones, the logic will produce a one at only one of these bit positions; the other positions will contain zeros. The left edge is at position zero if EIR_RMU_ST_MSK(0), derived from SH_ST_MSK(0), is a one. The later statement is true only for left shifts. For right shifts determination of whether the left edge is at position zero requires the application of the algorithm described in the following paragraph. Therefore, EIR_RMU_ST_MSK(0) is selected as LEFT_EDGE_DETECT(O) by the mux only if a left shift is being executed.

For right shifts, the mask will consist of a string of ones on the left followed on the right by a string of zeros. In this case, the left edge can only occur at bit position zero. The left edge is at zero iff the shift amount is zero. Since the BRANCH-LO status of SHNEG is not needed for single right logical shifts, the mask will be all ones when the shift amount is zero. Therefore, the left edge at zero can be detected by ANDing EIR_RMU_ST_MSK(0) with EIR_RMU_ST_MSK(63). This is accomplished by the right leg of the multiplexer producing LEFT_EDGE_DETECT(O) when RIGHT is active. At the remaining bit positions i, $1 \leq i \leq 63$, the logic described above for producing LEFT_EDGE_DETECT(i) produces zeros for the pattern of ones and zeros contained in EIR_RMU_ST_MSK(0:63) for right logical shifts. Therefore, this logic produces the desired results for the detection of the left edge for both right and left logical shifts.

Once the left edge of the mask has been found, SHNEG can be determined in a similar manner as that used to determine result equal zero. Referring to FIG. 19, LEFT_EDGE_DETECT(0:63) is bitwise ANDed with LSH(0:31) and RSH(0:31) via the X32 2WAND, 2WAND, and X31 2WAND blocks that are fed with the (0:31), 32, and (33:63) outputs of the left edge detect block as well as LSH(0:31)

and RSH(0:31). A 64 bit OR between the results of the bitwise AND is accomplished by the subsequent 32WOR, 31WOR, and two 2WOR blocks in the path that produce the right leg of the multiplexor used to generate SHNEG. Because only the bit of the left edge detect output that is associated with the input bit that will become the MSB of the shifter output is a one, the result of the 64 way OR will be a one iff the MSB at the output will be a one. Hence the shifter negative BRANCH-LO condition can be predicted from the inputs. The architecturally compliant condition code is generated off these results by ANDing it with the ones complement of the overflow condition, SH_OVFL. The generation of these signals is also shown in FIG. 19.

Result Greater Than Zero Prediction

Once result less than zero is predicted, the generation of result greater than zero is essentially free. Result greater than zero consists of inverting result less than zero, SHNEG, and gating the result with shift not zero and shifter not overflow signals. This is depicted in FIG. 19 by the INV block and 2WAND block in the path from SHNEG to produce SH_CC_(2) as well as the INV block from SHOHIDZ into the 2WAND. The generation of these signals has already been discussed.

Left Most Inserted Bit a One

Left most inserted bit a one is required to produce an architected condition code required for the ESA/390 instruction insert character under mask, ICM. In executing this instruction, up to four bytes of storage data, as determined by the number of ones in a four bit mask field of the instruction are fetched from storage and staged, right aligned in RSH. The fetched bytes are inserted into the contents of a GPR read into LSH from either a GPR or fed to LSH from the bypass bus. To generate the condition code, the left most bit of the storage data must be tested for one.

When ICM is specified by the MERGE operation of the SH_OP field of the microinstruction, all inserted bits zero must be detected to comply with the architected condition code settings for that instruction. Furthermore, SHO(0:31) equal zero must be detected for the operation to produce the BRANCH-LO condition SHOHIDZ. To determine these conditions, EIR_RMU_ST_MSK(0:63) is ingated from ICM_ST_MSK(0:63), whose generation was described previously. In a similar fashion to the prediction of SHNEG for logical shifts, EIR_RMU_ST_MSK(0:63) as produced for this operation can be used to determine whether the left most inserted bit is a one by detecting the left edge of the ones contained in EIR_RMU_ST_MSK for bit positions i such that $32 \leq i \leq 63$. For bit positions $33 \leq i \leq 63$, the left edge can be detected with the identical logic as that for producing the left edge for predicting SHNEG for logical shifts. Only the detection of the left edge at bit position 32 is unique. At that bit position, the left edge can be determined by simply testing whether the mask EIR_RMU_ST_MSK(32) is a one. If the bit is a one, the left edge is at position 32; otherwise, the left edge is somewhere else or does not exist. The edge does not exist if the four bit mask is a zero. The status being predicted, however, is only valid for the ICM instruction. In the SCISM processor, an ICM having a mask of zero is considered to be a special case and is handled separately. The shifter is not used in its execution; therefore, the result of the left edge detection logic is zero at each and every bit position i for $32 \leq i 63$ except for the position corresponding to the left most inserted bit.

Since the output of the left edge detect logic is a one only at the position corresponding to the left most inserted bit, left most inserted bit a one status can be predicted via the bitwise AND between each bit of RSH and the result of the left edge detection logic just discussed, followed by a 32 way OR between the results of the bitwise AND. The logic required is shown in FIG. 19. It consists of the left edge detection block, the 2WAND between 32M from the left edge detect logic and RSH(0), the bitwise AND between LEFT_EDGE_DETECT(33:63) and RSH(1:31), the 32WOR of the results of the bitwise AND and the AND between LEFT_EDGE_DETECT_32M and RSH(0) shown as a 31WOR followed by a 2WOR in the figure. The resulting signal, ICM_CC_(1) is the architected condition, left most inserted bit a one, for setting the condition code when executing ICM. It can be seen from the figure that the left edge detection logic, and the x31 2WAND followed by the 31WOR are shared with logic used to predict the SHNEG BRANCH-LO condition.

Left Most Inserted Bit a Zero and Not All Inserted Bits Zero

The condition left most inserted bit a zero and not all inserted bits zero is easily determined from the detection of the conditions that the left most inserted bit a one and all inserted bits a zero. This is accomplished by one's complementing the all inserted bits a zero followed by the 2WNOR between the results of this one's complement and the condition that the left most inserted bit a one. The generation of this condition, denoted as ICM_CC_(2), is also shown in FIG. 19.

While we have described our preferred embodiments of our invention, it will be understood that those skilled in the art, both now and in the future, may make make various improvements and enhancements which fall within the scope of the claims which follow. These claims should be construed to maintain the proper protection for the invention first disclosed.

What is claimed is:

1. A computer system comprising in combination:
   a combination shift-rotate/merge functional unit having input operands comprised of a left half and right half parts,
   an instruction decode and issue means for decoding and issuing instructions to the functional unit,
   said functional unit comprising means responsive to said instructions to carry out a shift function to shift the bits of one or more of said operands to more or less significant bit positions, and to carry out a merge function to merge said operands,
   a status mask generator responsive to said instructions to generate a status mask, and
   a status generator responsive to said status mask and said operands to predict the status of the result to be produced by said functional unit in response to said instructions, said status including a status condition which depends upon said shift function and a status condition which depends upon said merge function.

2. A computer system according to claim 1 including
   a shifter control generator comprising decoding means to decode inputs from the computer system's instruction decoding and setup to produce an indication of the shift amount for the status mask generator, an indication that a single, right shift is being executed, a four bit merge mask for controlling merge operations, an indicator that arithmetic shifts are being executed, an indicator that a right shift is being executed, and an indication that an single shift is being executed.

3. A computer system according to claim 2 wherein the status mask generator includes a shift status mask generator to generate a shift status mask, an INSERT CHARACTER UNDER MASK (ICM) status mask generator to generate an ICM status mask, and a status mask selector to select said shift status mask or said ICM status mask.

4. A computer system according to claim 3 wherein the shift status mask generator comprising decoding means for decoding said shift amount from the shifter control generator into individual mask bits corresponding to input operand bit positions where the mask bits at a given position is a logic zero for those bit positions corresponding to bits of the input operand that would be shifted out of the right side of the shifter for right double logical shifts.

5. A computer system according to claim 4 wherein the decoding means provides for generating said mask bits, upon receiving indication of a right single shift from shifter control generator means wherein the mask bits corresponding to the said right half part of the input operands are a logic zero, and the mask bits corresponding to the said left half part of the input operands are generated in accordance with the mask bit being a logic zero if the corresponding input operand bit of the said left half part of the input operand is shifted out of the right side of the left half of the shifter, and a logic one if the corresponding input bit is retained in the left half of the shifter during the shift operation.

6. A computer system according to claim 2 including a multiplexor control generator having indicators from the shifter control generator that indicate that an arithmetic shift, a right shift, and a single shift is being executed, said indicators being decoded to generate controls for the assembler means, said controls indicating that a right arithmetic, left arithmetic, right logical or left arithmetic, left logical, single and right (and its complement) is being executed.

7. A computer system according to claim 6 including a status mask assembler responsive to controls generated by the multiplexor control generator to assemble individual mask bits into a 64 bit mask field as appropriate for generating shifter status for arithmetic/logical, single/double, right/left shift operations by selecting for bit position zero either individual mask bit zero if a right logical or left arithmetic operation is being executed, or forcing bit position zero to a logic one if a right arithmetic operation is being executed, or selecting individual mask bit 63 if a left logical shift is being executed; by selecting for bit position i, where 1≦i≦31, individual mask bit i if a right shift is being executed, 63-i if a left logical shift is being executed, or 64-i if a left arithmetic shift is being executed; and by selecting for bit position i, where 32<i<63, individual mask bit i if the shift is not a single, right shift, 63-i if a left logical shift is being executed, or 64-i if a left arithmetic shift is being executed.

8. A computer system according to claim 3 wherein the ICM status mask generator includes a decoding means for decoding said 4 bit merge mask and a generator means for producing a 64 bit ICM status mask.

9. A computer system according to claim 8 wherein said 4 bit merge mask is decoded by said decoding means of claim 8 to produce an indication that all four bits of said merge mask are a logic one, three or more of the said mask bits are a logic one, two or more of the said mask bits are a logic one, and one or more of the said mask bits are a logic one.

10. A computer system according to claim 8 wherein the indicator of generated by said generating means indicates that all four bits of said merge mask are a logic one, said indicator that three or more of said merge mask bits are a logic one, said indicator that two or more of said merge mask bits are a logic one, and said indicator that one or more of said merge mask bits are a logic one are used to gate 'FF'X or '00'X to bit positions 32:39, 40:47, 48:55 and 56:63, respectively, of the ICM status mask with 'FF'X being gated if said indicator is a logic one and '00'X being gated if said indicator is a logic zero and wherein said four bit merge mask is used to gate either 'FF'X or '00'X to bit positions 0:31 of the ICM status mask with a 'FF'X gated to bits 0:7, 8:15, 16:23, and 24:31 when said merge mask bits 0, 1, 2, and 3, respectively, are a logic zero and '00'X gated to bits 0:7, 8:15, 16:23, and 24:31 when said merge mask bits 0, 1, 2, and 3, respectively, are a logic one.

11. A computer system according to claim 3 wherein the status mask selector includes a multiplexor for selecting the shift status mask when executing a shift and the ICM status mask when not executing a shift.

12. A computer system according to claim 3, including staging registers, and wherein the shifter control generator and status mask generator operate in parallel with the reading of said left and right part of the input operands to the staging registers to latch the status mask the staging registers so that the status mask and the left and right part input operands are available at the beginning of the execution cycle for predicting shifter-rotate/merge functional unit status.

13. A computer system according to claim 3 including staging registers to store a 64 bit status mask from said status mask generator, indicators from the shifter control generator that an arithmetic shift and that a right shift, as well as said left and right parts of the input operands so that all information is available to the status generator immediately in the execution cycle.

14. A computer system according to claim 13 wherein the status generator includes predicting means to predict a shifter overflow status condition, a result equal zero status condition, a result equal zero and no overflow status condition, a result greater than zero and no overflow status condition, a result less than zero status condition, a result less than zero and no overflow status condition, a left most inserted bit a one status condition, a left most inserted bit a zero, not all inserted bits zero status condition.

15. A computer system according to claim 14 wherein said status generator includes a left edge detector to detect the left most logic one bit of the status mask stored in said staging registers to produce a 64 bit value wherein all bits are a logic zero except for the position corresponding to the left most logic one in the said stored status mask and generating an additional value wherein a logic one is produced if the stored status mask at bit position 32 is a logic one said additional value being used when said stored status mask is the ICM status mask from the ICM status mask generator.

16. A computer system according to 15 wherein in the predicting means the said 64 bit output of the left edge detector is bitwise ANDed with the left and right part of the input operands whose results are 63 way ORed to produce an indicator that the result is less than zero for logical type shift operations with the output of the 63 way OR multiplexed with the left most bit of the left part of the input operand under control of the said stored indication that an arithmetic shift is being executed, wherein the multiplexing is performed in such a manner that if the said arithmetic shift indicator is a logic one, then the left most bit of the left part input operand is selected as the result while the output of the 63 way OR is selected as the result if said arithmetic shift indicator is a logic zero to produce an indication that the result is less than zero, and wherein the right most 31 bits of the said 64 bit result of the left edge detector is bitwise ANDed with the right most 31 bits of the said right part of the input operand, with the 31 outputs ORed to produce an indication that the left most result bit is in the right most portion of the right part of the input operand.

17. A computer system according to claim 16 where in in the predicting means said additional value from the left edge detector is ANDed with the left most bit of the right part input operand whose output is ORed with the said indication that the left most result bit is in the right most portion of the right part of the input operand to produce an indication that the left most inserted bit is a logic one.

18. A computer system according to claim 14 wherein in said predicting means said stored status mask and said stored left part and right part of the input operand, and said stored indicator from shifter control generator that a right shift is being executed are used to generate shifter overflow status condition by using the said stored 64 bit stored status mask to gate the left most bit of said left part of the input operand to one side of a bitwise comparator at bit positions corresponding to input bits that are shifted from the shifter during its execution and to gate to the other side of the bitwise comparator the input operand bits that are shifted out of the shifter during its operation wherein said bitwise comparator compared all lost input operand bits with the left most bit of the input operand to determine if any of the lost bits differ from the left most bit with resulting comparison value gated with the complement of the said stored right shift being executed indicator to produce shifter overflow status condition.

19. A computer system according to claim 14 wherein in the predicting means, result equal zero status condition is ANDed with the complement of shifter overflow status condition to produce an indication of result equal zero and no overflow.

20. A computer system according to claim 14 wherein in the predicting means the result less than zero status condition is ANDed with the complement of the shifter overflow status condition to produce an indication of result less than zero and no overflow.

21. A computer system according to claim 14 wherein in the predicting means the complement of the result equal zero status condition, the complement of the result less than zero status condition, and the complement of the shifter overflow status condition are ANDed to produce an indication of result greater than zero and no overflow.

22. A computer system according to claim 14 wherein said predicting means predicts an all inserted bits zero status condition.

23. A computer system according to claim 22 wherein said predicting means predicts all inserted bits zero status condition by ANDing the right most 32 bits of said stored status mask bitwise with right part of input operand, with 32 results NORed to produce an indication that all inserted bits are zero.

24. A computer system according to claim 22 wherein said predicting means predicts Result equal zero status condition by bitwise ANDing the left most 32 bits of the stored 64 bit status mask the stored left part of the input operand followed by a 32 bit NORing of the bitwise AND results, with output of 32 bit NOR ANDed with all inserted bits zero status indication to produce result equal zero status indication.

25. A computer system according to claim 22 wherein in the predicting means the left most inserted bit a one status condition is NORed with the complement of the all inserted bits zero status condition to produce an indication that left most inserted bit a zero, not all inserted bits zero.

\* \* \* \* \*